(12) United States Patent  
Linga et al.

(10) Patent No.: US 9,253,170 B2
(45) Date of Patent: Feb. 2, 2016

(54) METHOD AND APPARATUS FOR SECURING MOBILE APPLICATIONS

(71) Applicant: AppSense Limited, Warrington, Cheshire (GB)

(72) Inventors: Prakash Linga, Belmont, CA (US); Ajay K. Arora, Redwood City, CA (US)

(73) Assignee: AppSense Limited, Cheshire (GB)

( * ) Notice: Subject to any disclaimer, the term of this patent is extended or adjusted under 35 U.S.C. 154(b) by 0 days.

(21) Appl. No.: 14/480,662

(22) Filed: Sep. 9, 2014

(65) Prior Publication Data

US 2015/0200921 A1    Jul. 16, 2015

Related U.S. Application Data

(63) Continuation-in-part of application No. PCT/US2013/029811, filed on Mar. 8, 2013.

(60) Provisional application No. 61/608,819, filed on Mar. 9, 2012.

(51) Int. Cl.

| | |
|---|---|
| *G06F 21/00* | (2013.01) |
| *H04L 29/06* | (2006.01) |
| *G06F 21/44* | (2013.01) |
| *G06F 21/54* | (2013.01) |
| *G06F 3/0482* | (2013.01) |

(52) U.S. Cl.
CPC ............ *H04L 63/061* (2013.01); *G06F 3/0482* (2013.01); *G06F 21/44* (2013.01); *G06F 21/54* (2013.01); *H04L 63/083* (2013.01); *H04L 63/30* (2013.01)

(58) Field of Classification Search
CPC ......... G06F 21/44; G06F 21/50; G06F 21/51; G06F 21/52; G06F 21/53; G06F 21/54; G06F 3/0482; H04L 63/061; H04L 63/083; H04L 63/30
USPC .................................................. 713/171, 189
See application file for complete search history.

(56) References Cited

U.S. PATENT DOCUMENTS

| | | |
|---|---|---|
| 2004/0117659 A1 | 6/2004 | Karaoguz et al. |
| 2004/0187018 A1 | 9/2004 | Owen et al. |

(Continued)

OTHER PUBLICATIONS

Non-Final Office Action dated Jul. 25, 2013 for U.S. Appl. No. 13/790,561, filed Mar. 8, 2013.

(Continued)

*Primary Examiner* — Yogesh Paliwal
(74) *Attorney, Agent, or Firm* — Cooley LLP

(57) ABSTRACT

In some embodiments, a method includes obtaining an object code of an application executed on a mobile device. The application is created by an author different from an operator of a data source. The method includes loading dynamically at least one intercept point into the object code, wherein the intercept point is to detect a predetermined input gesture. The method further includes, responsive to an input gesture being received within a context of the application at the mobile device and the input gesture matching the predetermined input gesture: (1) overlaying a user interface within the context of the application, the user interface permitting selection of data items from the data source; (2) determining from a selection signal received at the mobile device, a selected data item; (3) responsive to the determining, loading the selected data item into the context of the application; and (4) removing the user interface overlay.

19 Claims, 7 Drawing Sheets

(56) References Cited

U.S. PATENT DOCUMENTS

| | | |
|---|---|---|
| 2005/0149726 A1 | 7/2005 | Joshi et al. |
| 2006/0098900 A1 | 5/2006 | King et al. |
| 2006/0277539 A1 | 12/2006 | Amarasinghe et al. |
| 2008/0194296 A1 | 8/2008 | Roundtree |
| 2009/0150680 A1 | 6/2009 | Buchanan et al. |
| 2009/0254912 A1 | 10/2009 | Roundtree et al. |
| 2009/0300110 A1 | 12/2009 | Chene et al. |
| 2011/0022846 A1 | 1/2011 | Ginter et al. |
| 2011/0035733 A1 | 2/2011 | Horning et al. |
| 2011/0080356 A1 | 4/2011 | Kang et al. |
| 2012/0159472 A1 | 6/2012 | Hong et al. |
| 2012/0210443 A1 | 8/2012 | Blaisdell et al. |
| 2012/0238206 A1 | 9/2012 | Singh et al. |
| 2012/0311131 A1 | 12/2012 | Arrasvuori |
| 2013/0239192 A1 | 9/2013 | Linga et al. |

OTHER PUBLICATIONS

International Search Report/Written Opinion mailed May 13, 2013 for PCT Application No. PCT/US2013/029811.

METHOD AND APPARATUS FOR SECURING MOBILE APPLICATIONS

CROSS-REFERENCE TO RELATED APPLICATIONS

This application is a continuation-in-part of PCT Patent Application No. PCT/US2013/029811, entitled "Method and Apparatus for Securing Mobile Applications," filed on Mar. 8, 2013, which claims priority to and the benefit of U.S. Provisional Patent Application No. 61/608,819, entitled "Method and Apparatus for Securing Mobile Applications," filed on Mar. 9, 2012, each of which is incorporated herein by reference in its entirety.

BACKGROUND

Some embodiments described herein relate generally to providing security for applications and data on mobile, or edge, clients.

Organizations such as, for example, financial institutions have various data protection and security requirements. Some employees and customers of such organizations would like to be able to use their personal mobile devices (e.g., iOS and Android) for business purposes and for accessing services provided by the organizations. In order to provide such capabilities to the users, the organizations need solutions that provide for device, application, and data security and management.

Some currently known solutions for securing mobile devices, such as, for example, Smartphones and tablets, lack comprehensive capabilities for managing applications, services, policies, devices, and data. Some organizations rely on the basic security policies of their mobile operating system (OS) provider. These policies tend to be quite coarse, thus wipe or delete the phone's entire memory or use a certain length password, etc. Similarly, some third party solutions provide a separate walled garden that does not allow arbitrary applications to be run or support fine-grain customization based on corporate policies and user preferences.

For example, some mobile operating system (OS) providers tend to provide limited device security, for example, to password protect a device, encrypt a device, wipe (erase data and reset) a device remotely, etc. If, however, system users can access their emails through a built-in mail client, they may be able to download attachments and save the attachments to unsecured locations. Storage of data in unsecured locations can be particularly problematic for financial and medical information. Similarly, a malicious application installed on the user's personal device can be running on the mobile device and be watching the clipboard, or accessing another application's cached or persistently stored data.

Furthermore, there is a range of existing security solutions on traditional enterprise clients (e.g. desktops and laptops) including the use of a variety of software to verify the computer, virtualize a work environment, and the like. Such solutions are not well suited for mobile devices, which have specialized operating systems and less computing power. Such mobile devices have more recently been targeted as highly personal, as opposed to corporate, devices. For example, some solutions manage and house, bring-your-own-PC solutions that provide a centrally managed virtual computing environment to laptops and desktops. In addition, some companies have defined self-contained application suites to provide a secure environment. This approach, however, does not enable users to access the full range of native applications available for the mobile device in a secure fashion.

Therefore, a need exists for solutions that provide for enterprise type security protection on mobile devices that allow for the devices to remain highly usable as both enterprise and personal mobile devices. Enterprises need systems to provide secure application distribution (including lifecycle management), location and networking environment awareness (e.g., to provide different access permissions inside the corporate network vs. outside), isolation of applications (corporate vs. personal), data encryption and isolation (e.g., application A cannot access application B's data without permission), user profile isolation/personalization, offline application data access and synchronization in an edge operating system agnostic fashion, etc.

SUMMARY

In some embodiments, a method includes obtaining an object code of an application executed on a mobile device. The application is created by an author different from an operator of a data source. The method includes loading dynamically at least one intercept point into the object code, wherein the intercept point is to detect a predetermined input gesture. The method further includes, responsive to an input gesture being received within a context of the application at the mobile device and the input gesture matching the predetermined input gesture: (1) overlaying a user interface within the context of the application, the user interface permitting selection of data items from the data source; (2) determining from a selection signal received at the mobile device, a selected data item; (3) responsive to the determining, loading the selected data item into the context of the application; and (4) removing the user interface overlay.

DETAILED DESCRIPTION

Figure 1:
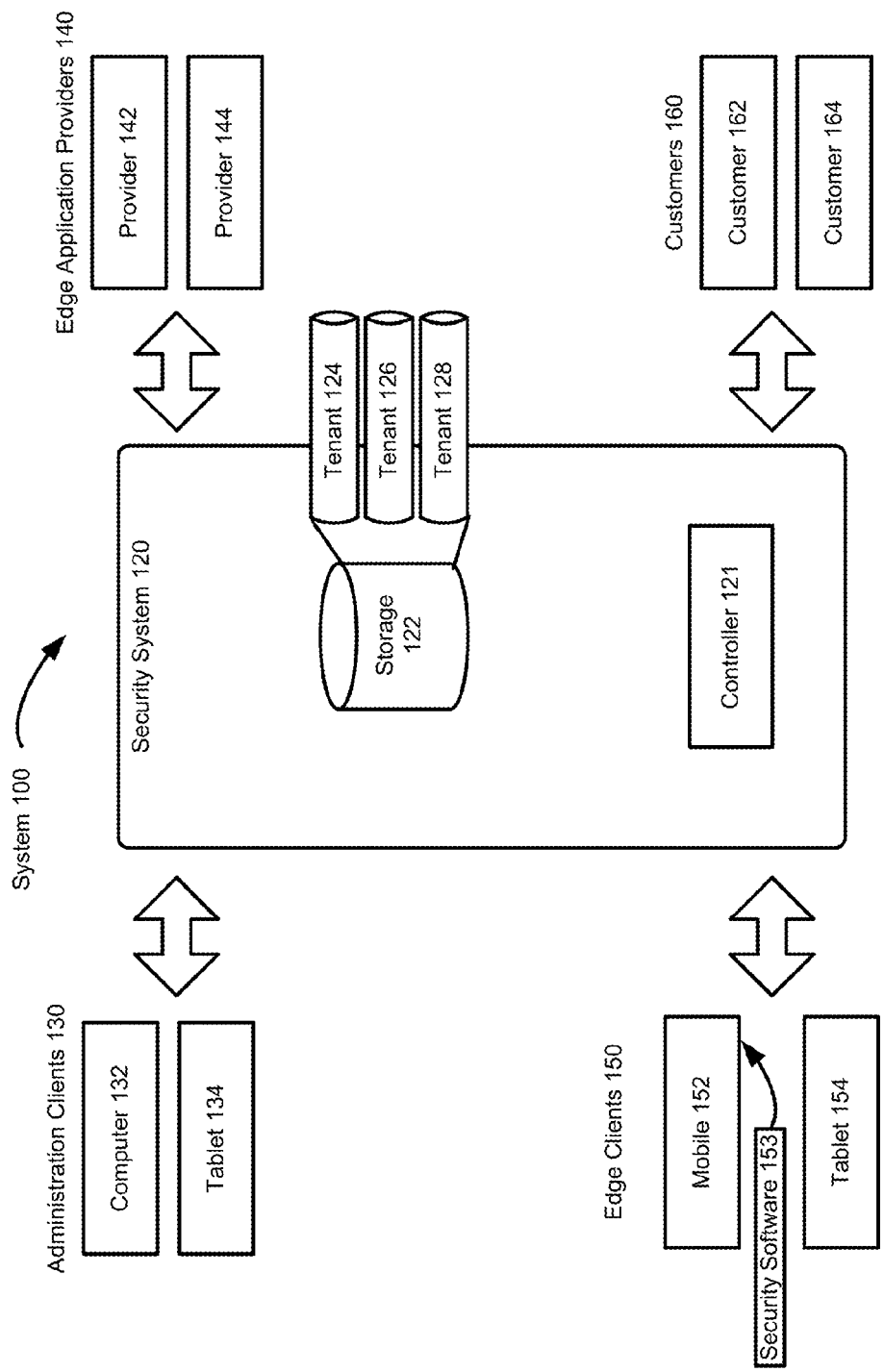
FIG. 1 is a schematic block diagram of a computer system in which mobile application security functions can be performed, according to an embodiment.

In some embodiments, a method includes obtaining an object code of an application executed on a mobile device. The application is created by an author different from an operator of a data source. The method also includes loading dynamically at least one intercept point into the object code of the application. The at least one intercept point is to detect a predetermined input gesture. In some instances, the predetermined input gesture is one of triple tap, swipe from sides or bottom, rotate, or panning.

The method further includes, responsive to an input gesture being received within a context of the application at the mobile device and the input gesture matching the predetermined input gesture: (1) overlaying a user interface within the context of the application, where the user interface permits selection of data items from the data source; (2) determining from a selection signal received at the mobile device, a selected data item; (3) responsive to the determining, loading the selected data item into the context of the application; and (4) removing the user interface overlay. In some instances, the user interface provides information about a secure context enforced on the application.

In some instances, the loading the selected data item includes retrieving the selected data item from a remote computer over a network. In such instances, the method further includes decrypting the selected data item from a first encrypted format using a first key, and encrypting the selected data item with a second encrypted format using a second key. In some instances, the first encrypted format is the same as the second encrypted format, and the first key is different from the second key.

In some embodiments, a method includes obtaining a modified object code of an application executed on a mobile device. The modified object code is defined from an unmodified object code of the application. The unmodified object code is provided by a first party. The modification includes: (1) removal of a digital signature on the unmodified object code of the application; (2) installing at least one intercept point into the unmodified object code of the application; and (3) signing the application with a digital signature of a second party to define the modified object code, where the second party is different from the first party.

The method also includes executing the modified object code of the application on the mobile device. The method further includes, responsive to an input gesture being received within a context of the application at the mobile device and the input gesture matching a predetermined gesture: (1) overlaying a user interface within the context of the application on the mobile device, where the user interface permits selection of data items from a data source; (2) determining from a selection signal received at the mobile device, a selected data item; (3) responsive to the determining, loading the selected data item into the context of the application; and (4) removing the user interface overlay.

In some embodiments, a method includes obtaining an object code of an application executed on a mobile device. The application is created by an author different from an operator of a data source. The method also includes loading dynamically at least one intercept point into the object code of the application. The at least one intercept point is to detect a predetermined input gesture.

The method further includes, responsive to an input gesture being received within a context of the application at the mobile device and the input gesture matching the predetermined input gesture: (1) overlaying a user interface within the context of the application, where the user interface provides a secure task manager allowing selection and activation of a group of applications executed on the mobile device which are within a given security context; (2) determining from a selection signal received at the mobile device, a selected application from the group of applications; (3) responsive to the determining, activating the selected application on the mobile device; and (4) removing the user interface overlay.

In some embodiments, a system includes a storage, a network interface and a computer system. The computer system is communicatively coupled with the network interface and the storage. The computer system includes a controller configured to receive an object code of an application executed on a mobile device. The application is created by an author different from an operator of a data source. The controller is also configured to dynamically load at least one intercept point into the object code of the application. The at least one intercept point is to detect a predetermined input gesture.

The controller is further configured to, responsive to an input gesture being received within a context of the application at the mobile device and the input gesture matching the predetermined input gesture: (1) overlay a user interface within the context of the application, where the user interface permits selection of data items from the data source; (2) determine from a selection signal received at the mobile device, a selected data item; (3) responsive to the determining, load the selected data item into the context of the application; and (4) remove the user interface overlay.

As used herein, a mobile device is a portable electronic device such as, for example, a mobile phone, Smartphone, tablet, managed laptop or the like. Mobile devices differ from general purpose computing devices in that the operating system (OS) provides a more secure initial environment, (e.g., digital signing of applications, an application store (and policies on what can be in the application store), restrictions on certain applications operating in the background, and restrictions on modifying the operating system). These restrictions generally impede the use of existing software and OS modification techniques used on general purpose computers to provide enterprise security. Current exemplary mobile devices include iOS devices such as, for example, the iPhone and iPad; Android devices such as, for example, the Nexus Smartphone and Samsung Galaxy tablet; Windows mobile devices; Chrome laptops; Android wrist watches; and some netbooks with mobile-style operating systems. Generally, embodiments are targeted at small, handheld devices that a user can easily transport. Additionally, the mobile device can have a display and user input capabilities. Mobile devices are sometimes also referred to as edge clients.

As used herein, a policy is a rule (or group of rules) together with associated actions that govern specific attributes, conditions and actions of end users, devices and/or applications. Depending on the context, policy can also refer to a collection of multiple individual policies or policy sets set by a customer (or predefined by a supplier for a customer). In some embodiments, policy sets group policies into a logical grouping for management and application. In some embodiment, a policy set has a defined policy for each policy supported by the system, see exemplary policy list infra. Further, in some embodiments, each user group has at least two policy sets assigned, one for trusted locations/networks/timeout intervals and another for untrusted locations/networks/timeout intervals. In these embodiments, the simplest policy for the corporation could be placing users in a single group that is assigned two policy sets (one trusted and one untrusted).

As used herein, the singular forms "a," "an" and "the" include plural referents unless the context clearly dictates otherwise. Thus, for example, the term "a "mobile device" is intended to mean a single mobile device or a combination of mobile devices (e.g., mobile devices with access to a certain network, etc.).

FIG. 1 is a schematic block diagram of a computer system in which mobile application security functions can be performed, according to an embodiment. A system and processes to provide security protection on mobile devices that allow the devices to be usable for both secure purposes and personal purposes at the same time is described in FIG. 1. Because FIG. 1 is an architectural diagram, certain details are intentionally omitted to improve the clarity of the description.

The system 100 of FIG. 1 includes a security system 120, administration clients 130, edge application providers 140, edge clients 150 and customers 160. The security system 120 includes a controller 121 and storage 122. Storage 122 includes tenant 124, tenant 126, and tenant 128. The administration clients 130 include computer 132 and tablet 134. The edge application providers 140 include provider 142 and provider 144. The edge clients 150 include mobile device 152 and tablet device 154, where mobile device 152 includes security software 153. The customers 160 include customer 162 and customer 164.

In some embodiments, the security system 120, the administration clients 130, the edge application providers 140, the edge clients 150 and the customers 160 are coupled in communication (indicated by double-headed line with arrows at end). Although shown as communication with the security system 120, the communication path can be point-to-point over public and/or private networks. For example applications on mobile device 152 can be delivered directly from provider 142, or via a third party application store (not shown). Any of the communications can occur over a variety of networks, e.g. private networks, Virtual Private Network (VPN), Multiprotocol Label Switching (MPLS) circuit, or internet, and may use appropriate Application Programming Interface (API)s and data interchange formats, (e.g., Representational State Transfer (REST), JavaScript Object Notation (JSON), Extensible Markup Language (XML), Simple Object Access Protocol (SOAP), and/or Java Message Service (JMS)). The communications can be encrypted.

In some embodiments, communication can be over a network such as, for example, the internet, inclusive of the mobile internet, via protocols such as, for example, Enhanced Data rates for GSM Evolution (EDGE), Third Generation (3G), Long-Term Evolution (LTE), Wireless Fidelity (WiFi), and Worldwide Interoperability for Microwave Access (WiMax). Additionally, a variety of authorization and authentication techniques, such as, for example, username/password, OAuth, Kerberos, SecureID, digital certificates, and more, can be used to secure the communications.

A network connection can be a wireless network connection such as, for example, a Wi-Fi or wireless local area network ("WLAN") connection, a wireless wide area network ("WWAN") connection, and/or a cellular connection. A network connection can be a wired connection such as, for example, an Ethernet connection, a digital subscription line ("DSL") connection, a broadband coaxial connection, and/or a fiber-optic connection.

In some instances, the communication can include multiple networks operatively coupled to one another by, for example, network bridges, routers, switches and/or gateways. For example, the administration clients 130 can be operatively coupled to a cellular network and/or the security system 120 and/or the edge application providers 140 can be operatively coupled to a fiber-optic network. The cellular network and fiber-optic network can each be operatively coupled to one another via one or more network bridges, routers, switches, and/or gateways such that the cellular network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

In some embodiments, the controller 121 and the storage 122 can include one or more computers and computer systems coupled in communication with one another. The controller 121 and the storage 122 can also be one or more virtual computing and/or storage resources. For example, controller 121 can be one or more cloud computing platforms such as for example, Amazon® Elastic Computer Cloud (EC2) instances, and the storage 122 can be a storage service such as, for example, an Amazon® Simple Storage Service (S3). Other computing-as-service platforms such as, for example, Force.com from Salesforce®, Rackspace®, or Heroku® can be used rather than implementing the security system 120 on direct physical computers or traditional virtual machines.

In some embodiments, each of the customers 160 can be a single legal entity. For example, an enterprise can be considered a single customer. Thus, the box for customer 162 corresponds to one or more computer systems operated by, or on behalf of, that customer that can provide information to the security system 120. In some embodiments, customer 162 and customer 164 can include systems providing identity information, enterprise applications (e.g., an internal application of the enterprise), and policies, as well as storage and backup systems. The interconnection of these customer systems with the security system 120 is described in connection with FIG. 2 and integration services 260. Additionally, for convenience of discussion, each tenant (e.g. tenants 124-128) can be considered to be associated with one and only one customer. Some embodiments, however, support a hierarchical tenant model to allow for resellers and/or shared administration of policies. Thus, both customer 162 and customer 164 can be associated with a single tenant 124.

Additionally, while FIG. 1 is presented as primarily a multi-tenant, cloud-delivered solution, some embodiments can be implemented in a private environment for a single customer with a single tenant or as a private environment for a group of customers. In such an embodiment, the elements of FIG. 1 can be within an organization's network/cloud versus the shown configuration with elements spanning multiple networks.

Figure 2:
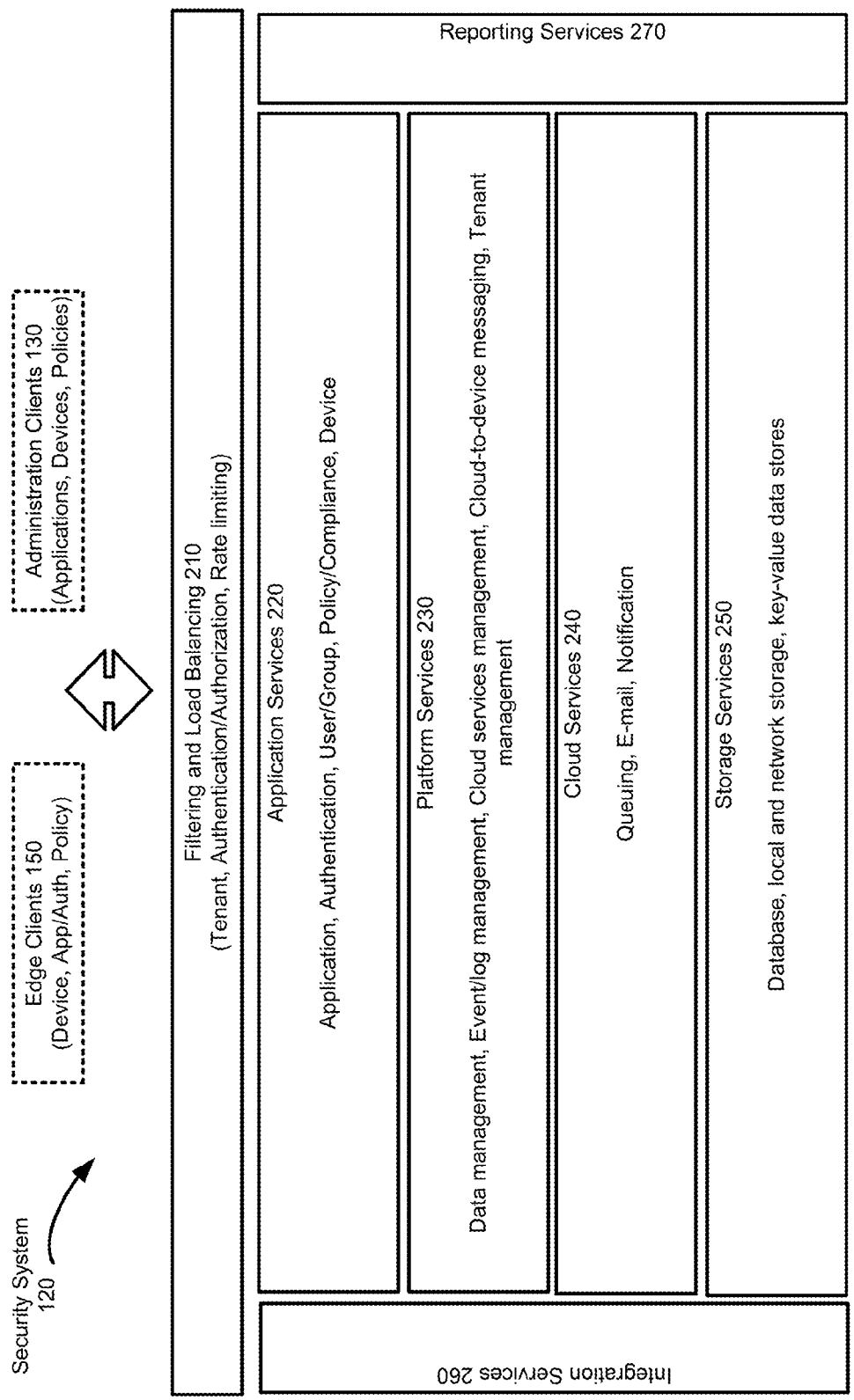
FIG. 2 is a schematic illustration of a security system, according to an embodiment.

FIG. 2 is a schematic illustration of a security system 120 of FIG. 1, according to an embodiment. Items in dotted lines in FIG. 2 show elements of FIG. 1 that are not part of the security system 120, specifically edge clients 150 and administration clients 130. The non-storage elements of FIG. 2 can be associated with the controller 121, and the storage elements can be associated with the storage 122. The security system 120 includes filtering and load balancing 210, application services 220, platform services 230, cloud services 240, storage services 250, integration services 260, and reporting services 270. The internal communications between these functional blocks are not shown, and the control for these functional blocks can be implemented in one or more computers, including virtual computers or cloud-delivered computing environments such as, for example, Elastic Computer Cloud (EC2), Elastic Load Balancing (ELB), Simple Queue Service (SQS), Simple Email Service (SES), Simple Notification Service (SNS), Elastic Block Store (EBS), Simple Storage Service (S3), and Simple DataBase (SimpleDB), provided by Amazon®.

Figure 3:
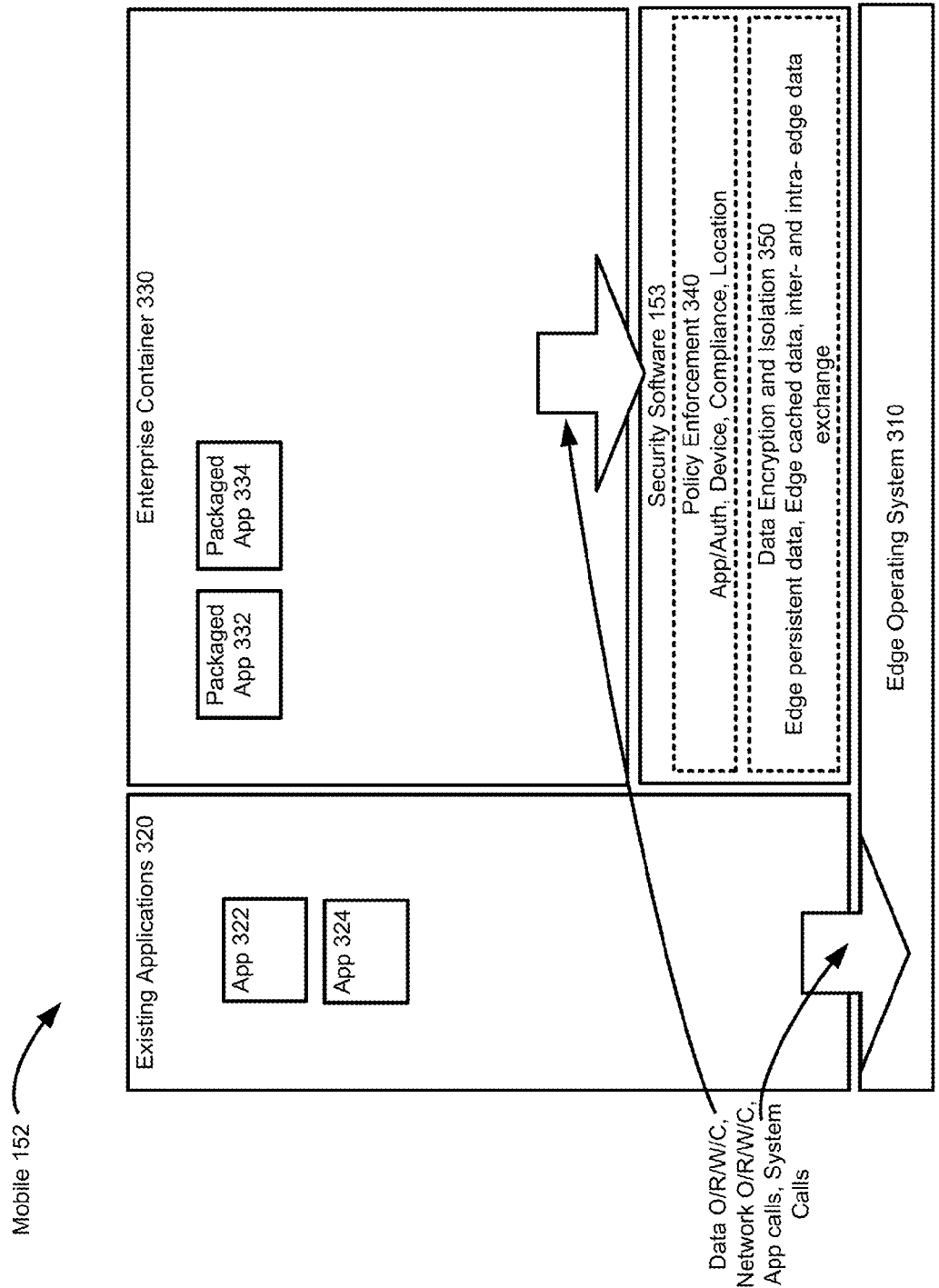
FIG. 3 is an illustration of sample operating system launcher screen of a mobile device, according to an embodiment.

FIG. 3 is an illustration of sample operating system launcher screen of a mobile device, according to an embodiment. In the diagram of FIG. 3, items in dotted lines represent conceptual functionality within the software blocks. FIG. 3 includes the mobile device 152 of FIG. 1 with the computing environment including the edge operating system 310. The existing applications 320, including applications App 322 and App 324, can make direct calls to the edge operating system 310. In contrast, applications in the enterprise container 330, Packaged App 332 and Packaged App 334, make their calls through the security software 153. The security software 153 includes two primary functional components, policy enforcement 340 and data encryption and isolation 350. A notable difference between the applications is that App 322 can directly interface with the edge operating system 310. In contrast, secured applications, e.g. Packaged App 332, interface with the edge operating system 310 via the security software 153 and cannot directly interface with 310. The mechanisms for packaging applications are discussed in greater detail.

In some embodiments, the packaged applications are identical to regular applications. The applications are, however, launched in a different manner to provide security. FIG. 3 also highlights a limitation on applications outside the secured enterprise container 330 accessing the applications within the container. The enterprise container 330 can also be referred to as a container. Also, the security software 153 can support multiple different enterprise containers on a single mobile device and multiple users of a single container on a single device. Thus, an employee of the organization can have both a container from the organization and a container from another organization/company on their mobile device. Similarly, if an employee of the organization allows another employee access to their mobile device, that other employee can authenticate themselves to the enterprise container 330 and be provided distinct access to the applications provisioned for them separate and apart from the original employee's access.

Having described the elements of FIGS. 1-3, their functions are described in the context of an example organization O1. For this discussion, it is assumed that the organization O1 is customer 162 which links to their server (e.g., Microsoft-compatible, Active Directory server) for identity provisioning and management, on the security system 120. The organization O1 is tenant 124 and O2 is the operator of the security system 120 as a service to multiple customers.

In some instances, starting from the corporate perspective, O1 signs up with O2 to use the security system 120 to secure the edge clients 150 of its employees and contractors. The edge clients 150 include a variety of mobile devices such as, for example, tablets and Smartphones from a variety of operating system vendors (e.g., Apple, Microsoft, Google, RIM, etc.). The users of the mobile devices may want to be able to access both their personal information (e.g., Facebook application), as well as corporate information (e.g., O1 internal dashboard applications and/or secure websites).

In some instances, one or more authorized individuals acting on behalf of O1 can use administration clients 130 to define a corporate security policy in the tenant 124 for O1. In some embodiments, the security system 120 provides a web-based administration client. Therefore, any web-device can be used as an administration client 130, for example, computer 132, tablet 134, or even mobile device 152 (not shown in FIG. 1). Through the administration interface, the policies for users, groups, devices, applications and more can be defined. For this example, the administration clients 130 are used to link the O1's Active Directory servers (e.g., customer 162) to the security system 120 and to define policies for users based on Active Directory groups. For example, devices belonging to users in the executives group can be automatically given access to the O1 internal dashboard, and other users can be given permission to access a specific version of an application A1 (e.g., version X.Y.Z), but not any other versions. This policy information is maintained in security system 120 as part of the data for tenant 124. The edge clients 150 (e.g., mobile device 152) in the hands of the CEO of organization O1 or tablet device 152 in the hands of a salesperson of O1, can communicate with security system 120 to obtain the policy information and for authorization and authentication purposes. More generally, the high portability—and easy theft—of the edge clients 150 opens up vulnerabilities, but the additional sensors and location information also provide opportunities for unique policies. For example, a policy can prevent access to corporate documents from certain countries. Similarly, the auditing information and data logs can identify data leakage, for example identifying that an application is sending information to IP addresses in a country of concern.

In some instances, the corporate policies are defined via administration clients 130 and maintained in storage services 250. Filtering and load balancing 210 ensures compartmentalization of the information as well as security. For example, in some embodiments, tenant 124 cannot access data belonging to tenant 126 and vice versa. Similarly, the rate limiting mechanisms can protect against a variety of attacks. At the application services 220 the primary policy definition takes place (a detailed list of policies is described in Table 1). Conceptually the policies can be categorized into several primary categories such as, for example, user policies or group policies, application policies (authorized vs. unauthorized application), authentication mechanisms for users, device management policies (similar to some existing OS-features such as, for example, wipe the device, lock the device, etc.), as well as other policy and compliance elements. In some embodiments, administration interface features for web-based definition of policies are associated with these settings. Additionally, integration services 260 supports receipt of some of these settings from existing enterprise solutions, for example, identity provision/management, application lifecycle and change management, compliance and control systems, enterprise back and storage systems, etc. For instance, a policy can cause encrypted enterprise data from the mobile device to be backed up to the existing enterprise storage services. Similarly, logs maintained by platform services 230 can be sent to existing enterprise notification systems.

Some embodiments include adapters in the integration services 260 for Active Directory, generic Lightweight Directory Access protocol (LDAP), Security Assertion Markup Language (SAML), or other application user authentications (e.g., Force.com). Notably, this can provide some unique advantages over other systems such as, for example, allowing a partial wipe (enterprise containers only) of a device in situations such as, for example, when an employee's employment is terminated or the device is stolen, or partial locks after a certain number of failed password attempts. This system provides for fine-grained controls focused on protecting enterprise data. In some instances, policies can be dynamically modified in substantially real-time without the need for reloading the device, container, or applications. Furthermore, policies can be easily layered allowing control to set policies for users crossed with devices, containers (group of applications), and individual applications. In addition, specific data protection policies allow for a highly flexible security environment to be defined.

In some embodiments, deprovisioning is an alternative term also used to describe selectively wiping applications or data. Some types of items are more difficult to delete. For example, if a binary data is separately installed, it generally will not be deleted until later launched. Such a scenario can, for example, occur with a non-MDM (mobile device management) distribution flow. However, the binary data and any associated data is still rendered unusable.

In some instances, the application services 220 can function as one or more data files provided to edge clients 150 for use by the security software 153. In such instances, the policy for the mobile device 152 can be delivered to the device over, for example, the Hypertext Transfer Protocol Secure (HTTPS) and interpreted and acted on by the security software 153. In some instances, the application services 220 can include application packaging and delivery to the device, including re-signing the application after any modifications, to define new statically linked packages.

In some instances, the platform services 230 provide functionality for services provided to administration clients 130 by the administration interface, such as, for example, cloud-to-device messaging, management of tenants, especially in environments with hierarchical tenancy where one tenant is inheriting some of the policies of another, management and heartbeat (e.g., status of systems and network connectivity) for the cloud environment, data management (e.g., of storage services 250), and interaction across integration services 260 with customers 160. Additionally, event and log management is supported, including integration back out to customer systems, views through the administration interface on administration clients 130, and/or reporting via reporting services 270 to third party reporting services, for example, via a defined SOAP/REST API. The audit capabilities allow the tenant administrator to get a better understanding of what applications do (e.g. sending data to unauthorized locations) as well as to perform compliance audits.

The cloud services 240 can be associated with basic cloud services available on many platforms, such as, for example, queues, emails, and other notifications. Also storage services 250 can be associated with one or more stores used by the security system 120, such as, for example, databases, key-value data stores, and/or local and network file storage. For example, in some embodiments some of the Active Directory data can be securely cached in the storage services 250 to provide faster response times, while other portions are cached more permanently to support customized policy development on the security system 120.

In some instances, some additional administrative interface actions (some features available to individual end users) can include register device, revoke/selective wipe/lock device, revoke/selective wipe application, revoke/selective wipe data, encrypt data, revoke/selective wipe container, send message/alert/notification to device, find device, send client logs, force device check-in, lost device, found device, take backup snapshot, turn on the camera (for a lost device), switch cellular networks, enforce secure data communication usage, screen sharing, etc.

Referring back to the user-side of the example of organization O1, considering that the CEO and the salesperson of organization O1 use mobile device 152 and tablet device 152 respectively. In some embodiments, both devices are registered with the security system 120, and the security software 153 is installed on both devices, for example as an application. In some embodiments, the enterprise container 330 is launched as a distinct application (for example as application 322) via the edge operating system 310 user interface (for example on an iOS device, from a button on the home screen that the administrator has named "O1 Container"). The container can prompt the user for full, simple, or no authentication (depending on the authentication policy) to, in turn, present an interface that according to some embodiments mimics the general User Interface (UI) appearance of the edge operating system 310 application launch interface. Additionally, depending on policies, the packaged applications for the enterprise container can have shortcuts outside this dedicated enterprise container environment in the main edge operating system 310 launch. Additionally, configuration of various settings such as, for example, Virtual Private Network (VPN) configuration, WiFi access points and passwords, email configuration, etc. can be pre-loaded. When using the packaged applications (e.g., packaged applications 332 or packaged applications 334), their data open/read/write/define calls, network accept/open/connect/listen/read/write/define calls, application calls, and system calls can be reviewed by the security software 153 for compliance with policies.

In some instances, from a user-experience perspective, even if the secure applications are on the launch interface of the edge operating system 310, they are isolated from the other applications. As a practical matter this can (depending on the policies defined by the provider of enterprise container 330) limit common actions by end users. For example, if packaged application 334 is the application A1, and if the user uses the edge operating system selection and clipboard to copy an email address, access to paste that email address from the clipboard can be limited to secured applications (applications in enterprise container 330). Thus, if application 322 is the built-in mail application, and the clipboard is restricted to the enterprise container 330, then if the user attempts to paste the clipboard into application 322, they cannot have access to the plain, or clear, text they originally copied. Further examples of security restrictions defined by policy can include modifying the results of clicking on links (e.g., open a different browser than OS standard) and the results of file open actions (e.g., attachments open in secure file viewer vs. OS standard handler for PDF or PowerPoint).

In some instances, the application isolation can protect against rogue applications. For example, to comply with policies set by marketplaces of edge operating system providers for mobile devices, often applications are supposed to store their data within a designated folder hierarchy. By default, this data is not encrypted. A rogue application can, however, access data outside of its designated folder hierarchy and retrieve sensitive corporate data. Thus, the security software 153 provides protection for the edge persistent data, edge cached data, and data exchange, both inter- and intra-edge.

In some embodiments, location-based and network-aware policies can be defined. Access to certain applications and/or data within the enterprise container 330 can be restricted by location and network. For example, if a salesperson is in the "inside sales" group, he/she can be restricted to accessing data associated with a sales application from within the corporate network. In contrast, the CEO who is in the "executive" group can be permitted to access data associated with the sales application on any network. In some embodiments, the policy decisions can be made by the customers 160 and defined in the security system 120.

In some embodiments, the operator of the security system 120 can enable customers 160 to provide a customized, enterprise application store to edge clients 150. The catalog can be exposed in the application providing the enterprise container 330 launcher, and can allow download directly from the security system 120 and/or the edge application providers 140. The marketplace can be a supplement to existing vendor/OS marketplaces. In contrast to the marketplaces, there can be stricter version control, and in many cases, the application is cryptographically signed with the customer or tenant provider key, as opposed to the general signing key used by the provider for that application. For example, a custom version of a secure mail program that is also sold in the OS marketplace can be re-signed by the customer after customization (new icon, application title, pre-loaded settings, and packaging for the security software) for distribution to edge clients 150. In some instances, no manual re-compilation/preparation is used to prepare applications for packaging in the enterprise application store.

Some embodiments provide support for offline access to the secure container. The policies set by the customer (or the tenant which the customer is using) can define the range of activities and possible uses offline, as well as how long the container can be used without connection to the security system 120. For example, in some embodiments, if the policy allows a container to be used for a week without access to the security system 120, then at the end of a week without a network connection, the container and the data can become inaccessible to the user. Once devices return to online mode, the system can force a synchronization and/or communication with the security system 120 (based on policies) to assure data synchronization, backup, log transfer, policy updates, and/or device/container disabling.

In some embodiments, improvements for enterprise security in a mobile device OS-agnostic fashion can be provided. For example, the improvements can include:

Edge application security and management:
    Customized application store and application distribution are enabled,
    Location-aware and network-aware policies are supported,
    Application isolation is provided.

Edge data security and management:
    Data encryption and isolation (e.g., able to wipe corporate data vs. whole device, rogue applications cannot access corporate data),
    User profile isolation and personalization (e.g., if CEO uses salesperson's mobile device, can get CEO's permissions and environment),
    Offline application and data access, with synchronization.

In some embodiments, various areas of security that can be covered by policies include:

Health:
    Device rooted,
    Device infected,
    Application blacklist,
    OS version less than/different than specified.

Authentication:
    Application launch authentication,
    Maximum password/pin attempts,
    Application foregrounding authentication.

Restrictions:
    Application file sharing (outbound),
    Application file sharing (inbound),
    Application location restrictions,
    External application/URL launch,
    Application printing permitted,
    VPN used,
    Offline use permitted,
    Maximum offline time,
    Bluetooth use permitted,
    SMS messages permitted,
    iMessage, or comparable SMS messaging alternative, permitted,
    Application exit upon background,
    Idle timeout (minutes),
    Action on idle timeout.

Data:
    Data encryption used,
    Data copy (outbound),
    Data paste (inbound),
    iCloud backup, or comparable cloud, permitted,
    Zero-out application memory on exit.

Figure 5:
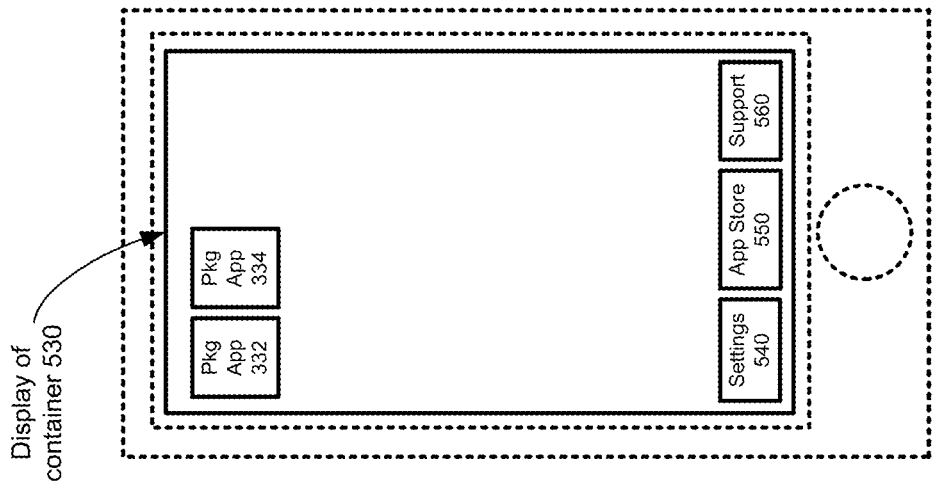
FIGS. 4-5 are illustrations of sample user interfaces, according to various embodiments.
Figure 4:
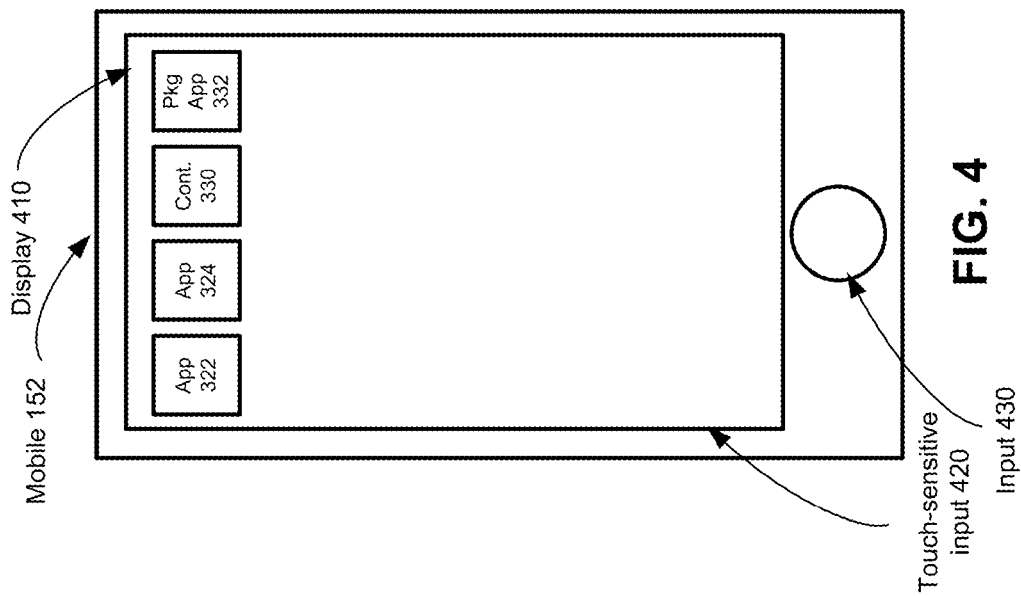

FIGS. 4-5 are illustrations of sample user interfaces, according to various embodiments. The mobile device 152 in edge clients 150 is shown explicitly in FIG. 4. In FIG. 5, the dotted lines represent the device. The device used in these examples is a prototypical current generation touch-screen mobile device, such as, for example, an iPhone from Apple Computer; however, other mobile devices can be used. Additionally, the user interface depictions are intentionally sparse to focus on key elements.

FIG. 4 shows a user interface according to an embodiment of the system. FIG. 4 includes the mobile device 152 with a display 410 and two input devices, touch-sensitive input 420 (covering the display) and a button input 430. In some instances, an operating system launcher is executing and displaying a launcher with icons capable of launching applications, specifically in this case icons for applications 322-324, enterprise container 330 (itself an application in this embodiment), and packaged application 332.

FIG. 5 shows the display 410 after container 330 is activated; specifically, it shows a display of container 530. The login and/or authentication screens have not been shown. The display of container 530 in this embodiment mimics aspects of the edge OS native launcher with icons for packaged applications (332-334). Note that based on policies established by the customer and/or tenant, packaged application 332 can be available from the operating system launcher. Additionally, there are buttons for a user of the enterprise container to adjust settings (settings 540), access the enterprise application store (app store 550), and support/report a problem for connecting users to enterprise help systems and resources (support 560). In other embodiments, applications other than the packaged application 332 can be available from OS launcher.

In some instances, administrator provisioned ("pushed") applications as well as user provisioned (e.g., via enterprise application store) applications are supported. For administrator-provisioned applications, an icon (or other similar representation) for the application can be shown in the Remote Application Platform (RAP) home screen (e.g., FIG. 5), and the applications can be automatically downloaded by the security software 153 and/or the underlying operating system application retrieval mechanisms. For user provisioned applications, the catalog can be defined by the administrator for the customer at a tenant level. As previously discussed, a single tenant can inherit information from other tenants and support multiple customers. For example, the operator of the security system 120 can provide a baseline set of more secure enterprise applications that tenants and/or customers inherit by default. From within the enterprise application store, applications can be installed in a similar point-and-click fashion to that used in existing application marketplaces, and the installed applications can then appear in the container home screen and/or the mobile device home screen.

In some embodiments, a user can request applications not listed in the catalog for administrator approval. Thus, for example, if an application such as, for example, "Remember the Milk" is available for the mobile device's OS, but not corporate approved for secure data access, the user can use the application store 550 to make requests for that application to the administrator.

In some embodiments, applications within the enterprise container 330 can be launched through an approach similar to that used by the OS. Because packaged applications are themselves "native" applications, they can also be accessible via multi-tasking and/or other launch mechanisms provided by the OS. Such accessibility can be subject to any policies limiting the application ability to run in the background, or the like.

In some embodiments, applications can be launched by a touch, click, activation signal and/or other input that launches the application and/or resumes the application. In some embodiments, the packaged application can include a shortcut to return to the enterprise container home screen (e.g., FIG. 5). Such a shortcut can be overlaid into the application, a custom gesture and/or special input, and/or an override of an existing gesture and/or special input. For example, on an iOS device, the button (e.g., input 430) typically returns to the main OS-provided launcher, however, in some embodiments the functionality of that input is modified to return to the enterprise container launch screen (e.g., FIG. 5). In other embodiments a custom gesture, (e.g., a four-finger swipe) can trigger a return to the enterprise container launch screen.

In some embodiments, the standard edge OS home action (e.g., input, gesture, etc.) can be retained to switch from the enterprise container context to the personal, or general/baseline OS, environment. The user can return to the enterprise container by activating the container 330 in the OS launcher (e.g., FIG. 4), or by activating an enterprise container application from the edge OS environment. Furthermore, application settings for both enterprise and personal applications can be managed through existing edge OS settings interfaces.

In some embodiments, customers and/or tenants can define offline usage policies for the enterprise containers they administrate. In one embodiment, there is no notification for each offline-online status change unless the policy prohibits offline usage. Instead, in some embodiments, users are notified as they approach the limit of their remaining allowed offline time. For example, if the CEO has been traveling for a week without connecting his/her mobile device to a network, and the policy allows seven days of offline access, then at several intervals approaching the deadline, the security software 153 and/or the enterprise container 330 can present prompts, notifications, and/or other warnings to the CEO. For example, in some embodiments, warnings are given at one day (for policies allowing more than one day of offline access), three hours, fifteen minutes, ten minutes, five minutes, one minute, etc. Other notification schedules are possible, and in some embodiments, they can be customized by policies set by the customer and/or the tenant.

In some embodiments, access to the enterprise container and packaged applications can be disabled if battery power is lower than a predetermined amount, (e.g., T %). This can be designed to ensure sufficient battery power to encrypt data and/or secure the device in case the battery runs out.

As previously discussed, in some embodiments, the security system 120 can be administered using a web browser on computers and/or mobile devices, such as, for example, administration clients 130. Similarly, users can be authorized to administer aspects of their enterprise container 330 from a web interface. In such embodiments, the user can be able to, for example, access the enterprise application store, take certain remote actions to self-secure and/or locate their device, review reports of their usage and/or those of individuals within their corporate organization, etc.

In some embodiments, the security software 153 and/or enterprise container 330 on the mobile device can be maintained and updated automatically using underlying edge OS features and functionality. In some embodiments, the policies set by a customer and/or a tenant can serve to push and/or force the user to perform an update prior to use. Similarly, packaged applications from the enterprise application store, which are version-managed (e.g., version X.Y.Z of application A1 is approved until the administrator approves new updates) can be maintained by the enterprise container 330 and/or the underlying edge OS functionality.

In some embodiments, the security system 120 provides for customized branding of the enterprise container 330 as displayed on the edge device (e.g., logos, colors, and fonts, superimposing logos on packaged application icons).

In some embodiments, on the first launch of the enterprise container, authentication is used. This can occur between FIG. 4 and FIG. 5 conceptually in time (not shown). From the point of authentication, the user can be considered to be in a session until the session terminates (e.g., enterprise container closed, time limit reached, etc.). The policies can control the boundaries of a session and the amount of authentication used, for example, using full/long password once a day versus short numeric Personal ID Number (PIN) for the rest of the day, etc.

In some embodiments, both offline and online out-of-band password reset processes are supported. For example, in offline mode, the user can use a recovery password to unlock the container for a fixed period of time. In online mode, the user can be prompted for a password reset. Additionally, in-band password reset handling can be supported for first login password changes, active directory password reset policies, etc. The user interface for these changes is not shown, but can be implemented with one or more dialog boxes. Additionally, a variety of authorization and authentication schemes such as, for example, use of two factor authentication, can be supported.

In some embodiments multiple concepts of idle time and/or inactivity can be linked to different policies. For example, the screen might be blanked but no password/PIN used after a very short time without providing user input in some applications. In contrast if there is no user input for a more extended period, a PIN might be used. After a lengthier period of time, a fuller password can be used. The specific requirements of the user can be determined by the entity establishing the policy.

In some embodiments, as shown in FIG. 4, shortcuts to packaged enterprise applications on the OS launcher are allowed. If those applications are launched directly, the user would still be prompted for authorization and/or authentication.

In some embodiments, there is a mechanism (e.g., support button 560) within the enterprise container 330 to contact the customer's support systems. In some embodiments, the system is directly provided by the security system 120. In other embodiments, the security system 120 transparently interfaces to the customer trouble-ticket and help desk systems (e.g., customer 162-164). In some embodiments, the system can offer the user an option to contact the organization's live support desk via voice, video and/or text chat.

In some embodiments, the first time the user wishes to access an enterprise container, he/she is guided through a self-install process as follows. In other embodiments, the device can be partially and/or fully provisioned to omit some of these steps using OS-based features for installing applications to managed devices. In the self-install embodiment, the user receives instructions from the administrator to download an application from the OS marketplace and the tenant name to use during installation (e.g. "example.com" tenant). Subsequently, the user can download and launch the application. The user can enter a corporate username and login, together with the tenant name (if different from domain name of email address) to connect the downloaded application to the corporate policies. This can cause the downloaded application to behave similar to the enterprise container 330 as discussed herein. Additionally, administrator-pushed, packaged applications can be downloaded automatically.

In some embodiments, a container of a single application can be represented as a single icon (e.g., directly on the OS-launcher) without the container metaphor use. Thus, the container can behave like a single application, however, the discussed security capabilities and policies can be applied. Additionally, some embodiments can provide access to an enterprise application store to download additional applications approved by the organization managing the container.

In some embodiments, packaging applications for the secure environment is performed. The selected embodiment depends on the source of the application (edge application providers 140) whether the provider pre-modify the application to be packaged, the policies of the edge operating system 310, and the operator of an online marketplace for application delivery for the edge operating system 310. For example, Apple has relatively restrictive policies for applications running on iOS. Apple can not accept dynamically linked applications on the public-facing App Store (to libraries outside of those provided by Apple). Thus, even if application providers want to provide applications in support for the security software 153, it can be challenging to deliver a single application to the public-facing App Store that can support both general customers and customers using the secure container.

In some embodiments, the primary packaging approaches used can include: (i) dynamic linking of applications with a library relevant for the security software 153 before distribution to the edge client; (ii) static linking with a library of specialized calls for the security software 153 before distribution to the edge client; (iii) decrypting a generally provided application, modifying the headers to use a library provided by the security software 153, and re-signing the application with a customer or tenant signing key for delivery to the edge client; and (iv) modifying the launch process for packaged applications to change the call table ("shimming"). The approaches can be divided into two categories, approaches (i) and (ii) can be generally performed by an application developer, while approaches (iii) and (iv) can be performed by the operator of the security system 120, or someone packaging applications therefore. While the four approaches can be used simultaneously, approaches (i) and (ii) can include greater cooperation of application developers for deployment of applications while approaches (iii) and (iv) can occur without the developers' direct involvement.

The approaches can use modification to at least two levels of calls made by applications to libraries, specifically both the higher-level APIs provided to developers (e.g., Cocoa APIs for iOS or Android APIs for Android), and the lower-level libraries such as, for example, the underlying C library (e.g., libc). In some embodiments, at least two levels of modifications can be used, because if the low-level calls are modified, then it may not be possible to prompt users for authentication and/or surface notifications. In the most general terms, the dynamic modification approach of (iv) can be described as adding two or more intercept points to an application by a second application.

In some instances, a low-level intercept is context free and therefore can be implemented by intercepting code in libraries that are responsible for handing off control to the kernel. These methods are typically in a few libraries (e.g., libc, libSystem, etc.). A high-level intercept, however, is context sensitive and can be implemented in high-level programming languages.

In some embodiments, a low-level intercept can be used to implement policies that do not use higher level application contexts. For example, a low-level intercept can be used when, for example, encrypting data at rest, encrypting data over a network, application level VPN tunneling, within network access control, protecting data in memory by wiping and/or erasing unused data, removing data in memory on termination of an application, etc.

In some instances, a low-level intercept can be, for example, implemented by modifying symbol resolutions in an application to point to and/or reference an implementation of a script (e.g., an authentication procedure). Various techniques can be used, in combination, to patch a symbol table for the symbol resolutions to be modified. In some instances, for example, an executable header of a symbol table is modified to insert a library/symbols. Such a modification can affect the load order of libraries and how symbols are resolved. In other instances, the symbol table is patched in memory at run time before the application code is executed.

In some embodiments, a high-level intercept can be used to implement policies that have a user interface (UI) component, policies that employ authentication, policies that are tied to APIs associated with Software Development Kits (SDKs) (e.g., copy and paste policies) and/or the like. In some instances, a high-level intercept can intercept a code in a class. High level dynamic languages such as, for example, Java (for Android) and Objective-C (for iOS) can modify code at runtime (e.g., swizzling). In some instances, an intercept can swizzle the codes at run time before the application code is executed. In some embodiments, a combination of the header modification and swizzling is used to 1) patch data structures in memory, and 2) use some runtime routines (e.g., method_exchangeImplementations in iOS) to change method implementations.

For example, if the Library (libc) reads calls are dynamically modified, as opposed to high-level Cocoa/Android/Windows/RIM APIs for reading files, then the security software can deny reads but may not be able to present authentication prompts, explanations, etc. Instead, by also modifying the higher-level API calls, requests to read files can trigger policy-defined authentication on a per-item basis. For example, when the CEO attempts to access an internal dashboard using an iOS application, the Cocoa API read request by the packaged application for the data from the network can trigger a policy using detailed, full-password authentication. In contrast, the salesperson accessing a packaged application inside the enterprise container 330 may trigger a lower, PIN authentication requirement. Or the policy may not use authentication if the salesperson has recently entered a password or PIN.

The Library calls (libc-level calls) that can be intercepted include, for example, close, open, lseek, read, pread, write, pwrite, stat, lstat, fstat, ftruncate, truncate, fopen, fdopen, freopen, rename, link, unlink, symlink, chmod, chown, lchown, dup, connect, listen, accept, and/or the like. In iOS implementations, additional higher-level calls that can be intercepted include, for example, UIDocumentInteractionController (file-sharing), UIPrintInteractionController (printing), MFMailComposeViewController (Mail), URLForUbiquityContainerIdentifier (iCloud), UIPasteboard (for copy/paste), and/or the like. Additionally, calls within UIApplication can include, for example, calls associated with touch events (e.g., detection-only; for idle time calculation), and calls to openURL method to regulate launching other applications.

Figure 6:
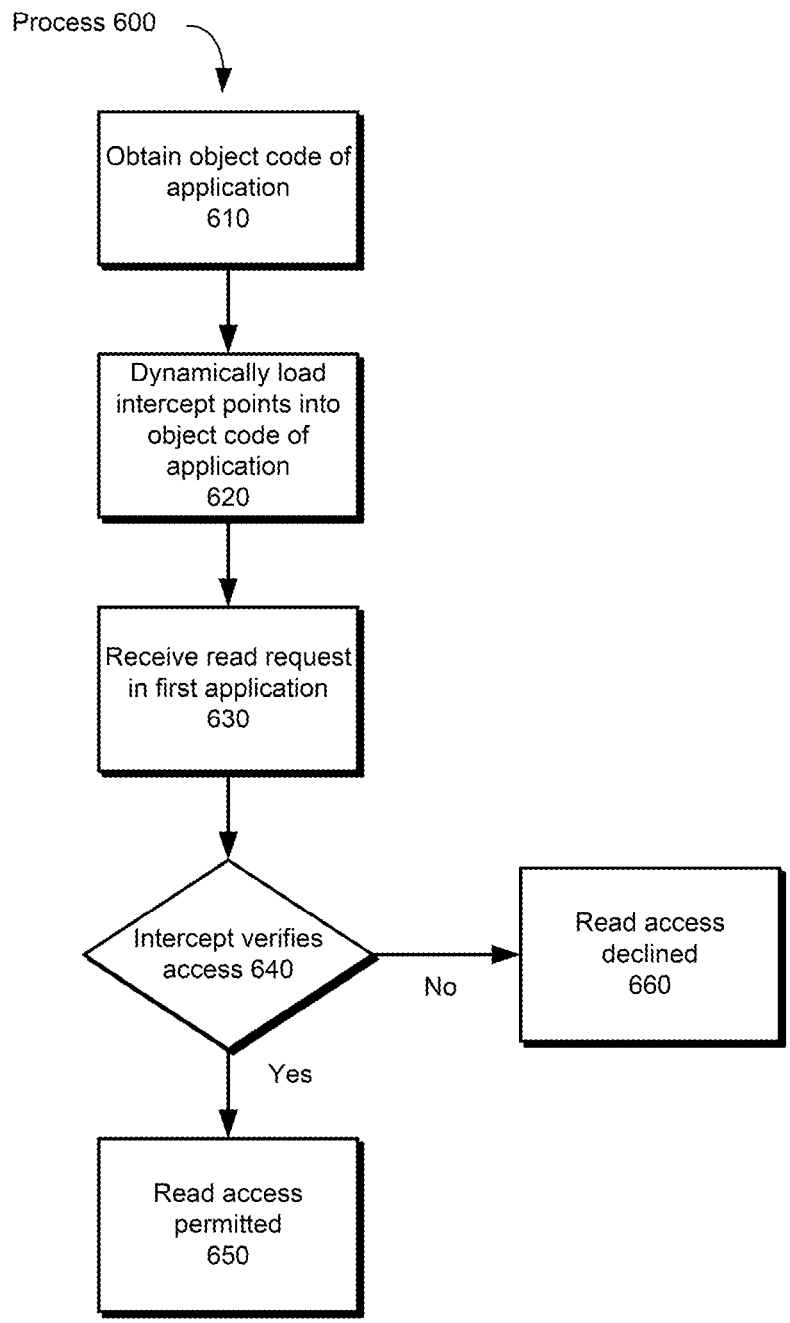
FIG. 6 is a flowchart of a process for providing mobile application security, according to an embodiment.

FIG. 6 is a flowchart of a process for providing mobile application security, according to an embodiment. FIG. 6 includes process 600, which starts at step 610 with obtaining the object code of an application by the security system 120 of FIG. 1. The object code can be obtained from a repository such as, for example, an application store or the on-device code. In the case of the on-device code, the obtaining can occur using an application load/launch process that accesses the object code representation of the application. At step 620, the security system 120 dynamically loads intercept points into the application. As discussed above, the intercepts can be placed both in higher level calls and low level calls to enable prompts for authentications.

At step 630, the application is executed and issues a request to read data to the underlying operating system. Although not explicitly shown, in some embodiments, the steps 610-620 can occur once per launch of an application in process 600 while steps 650-660 can be repeated multiple times. Additionally, while process 600 is shown in the read context, the same basic approach can be used for intercepting other calls discussed above. The read request for data can be intercepted by the library loaded by the security software at step 640 and authorization can be verified. In some embodiments, this can include prompting the user to authenticate to the device (e.g., enter password/PIN). If the intercept is able to verify the user's authorization, then the application is allowed to perform the read at step 650, including decrypting the data. If the user authentication is not verified, the read is declined at step 660. Note that in some embodiments, a declined read can return one or more of garbage data, encrypted data, an error code, and/or an exception.

In some instances, the intercept at the higher-level API can be omitted to improve performance. For example, with encryption, obtaining the password, and thus the key, a high-level intercept can be used. The ongoing encryption of packets, however, can use intercepts at the lower-level libraries that perform encryption and not the higher level intercept. Similarly, for some actions such as, for example, securely wiping freed memory a low-level library intercept can be used without a high-level intercept. Accordingly, for those calls where there is no need for human intervention/notification, the higher-level intercept can be omitted to improve performance.

Additionally, in some embodiments, the intercepts can modify the behavior of other OS-functionality to comply with policy and secure data. For example, in some embodiments, a PDF accessed from a secure email program can be openable in a secure PDF reader, as opposed to the OS provided PDF reader.

Some embodiments include additional features to handle pre-installed applications. Pre-installed applications include applications that are provisioned upon OS installation or update (e.g., iOS). Examples of these applications can include Mail, Contacts, Calendar, Notes, Browsers (e.g., Safari), etc. In some embodiments, these application binaries are not redistributed and/or copied. Thus several of the aforementioned application packaging approaches of (i), (ii) and (iii), described above, are not directly applicable. The fundamental concept of adding two intercepts, however, still remains and thus this is an embodiment of approach (iv), as described above.

Some embodiments provide policy enforcement, data encryption/isolation and other controls for pre-installed applications using a generic application launcher that has the ability to load an application binary, patch the binary (e.g., using two layers of added intercepts), and execute the patched, or modified, binary. Applications launched using this launcher can in substantially real-time, without any pre-wrapping, be able to enforce the set of application policies, controls and encryption that have been described above.

The following is an example of one such embodiment. Upon installation of a business container, additional icons are added for the container context for the key functions supplied by pre-installed applications, (e.g. Mail, Contacts, Calendar and Browser). Each of these icons corresponds to an application launcher that is programmed to load, patch and execute the respective pre-installed application. In the case of mail, a user can click the business mail icon that can then execute the installed launcher that in turn causes the Mail application binary to load, be patched, and executed. Although the pre-installed Mail executable is executed, the data (e.g., user accounts and mail messages) can be separate and distinct from any personal Apple Mail accounts that can be configured on the same device due to the patching. Thus, the same application is launched, but the data is separate and distinct from the generally available data outside the container. If the Mail application was launched by a specific launcher, the same interception techniques described above can be implemented dynamically (e.g., in real-time), to enforce policy restrictions, change what data the Mail application accesses and to provide the other features described such as, for example, encryption and data isolation.

Some embodiments can use the dynamic launching approach described for pre-installed applications with arbitrary applications, such as, for example, those from the iTunes store, as described herein. One difference between the pre-installed applications and other application-store obtained applications on current iOS implementations is that the pre-installed iOS applications can be loaded from the installed versions. In contrast, the executable code for other applications can be sandboxed differently and cannot be easily loaded once installed. This is not a technical limitation per se; but rather also a licensing compliance constraint. Since the application has already been paid for, or there has been a redemption code that has been entered to source the application, the binary of the application can be obtained and installed. In this example, the binary can be installed by the container, then that binary can be downloaded by or included in a launcher that launches, applies the two layers of intercepts, and executes the binary. Additionally, if desired, the icon for the original application loaded via the OS can be hidden.

In some instances (scenario 1), an application X can be installed prior to installation of the container. During (or after) installation of a container, application X can be detected and a signal received to indicate whether to install a business version of the application. This can be either a tenant or user directed decision, (e.g., IT policy vs. user prompt). For each business version, the executables for the application (e.g. a binary file) can be downloaded from the marketplace and a customized business launcher can be installed to launch the binary version of the application (this new launcher can employ approach (iv) described above).

In some instances (scenario 2), an application X can be installed after the installation of the container. In this instance, application X can be detected upon next container launch. Similar to scenario 1, the user prompted/IT preference can be enforced and a launcher can be defined that behaves as discussed in scenario 1, including obtaining and installing the executable for the application.

In some instances (scenario 3), an application X can be requested to be installed from tenant application catalog, but installed from OS marketplace. A user can select one or more applications for installation from a tenant application catalog. Despite the fact that the applications appear to be purchased/requested from the tenant application catalog, the actual applications can be purchased via the OS marketplace (e.g., iTunes store). In some embodiments, this is done transparently without the user directly seeing a launch of the marketplace application. As discussed above with respect to scenarios 1 and 2, the executable binary can be obtained and a launcher can be defined for each application. One difference can include (depending on the policy set for the user of the container) hiding the default application icon(s). Hiding the default application icons can have the effect of providing access to the application for business purposes and not allowing general and container uses.

In various instances, the discussed approach can be extended to various operating systems such as, for example, Android, RIM, Windows Mobile, etc. Additionally, while an emphasis has been placed on creating a launcher that downloads or invokes a binary using approach (iv), other types of launchers can be used for dynamically loading two layers of intercepts into a binary file.

In some embodiments, policies and their associated actions can be set and remotely enforced and/or invoked by tenant administrators at the user, application, application attribute, device, and/or device attribute levels. As noted previously, in some embodiments a policy set is a collection of one value for the listed policies, and each user is assigned to one or more groups having one or more applicable policy sets. In one embodiment each group can have at least two policy sets, one for trusted users and another for untrusted users. The policy sets and policy values can be stored in the storage 122 (e.g. in tenant 124-128) and delivered to edge clients 150 for use in implementing the policy by the security software 153.

In some embodiments, some of the policies can be closely aligned with existing Microsoft ActiveSync policies and can in some embodiments directly inherit the values assigned for that policy in ActiveSync. Table 1, shows a list of example policies.

TABLE 1

| Policy | Type | Default Value | Allowed Values | Actions | Description |
|---|---|---|---|---|---|
| Allow Bluetooth | Enumeration | Allow | Disable HandsFree Allow | Disable HandsFree Allow | This setting specifies whether a mobile phone allows Bluetooth connections. The available options are Disable, HandsFree, and Allow. |
| Allow browser | Boolean | True | True False | Allow Do not allow browser | This setting specifies whether Pocket Internet Explorer is allowed on the mobile phone. This setting doesn't affect third-party browsers installed on the phone. |
| Allow camera | Boolean | True | True False | Enable/ Disable camera not allow camera | This setting specifies whether the mobile phone camera can be used. |
| Allow consumer mail | Boolean | True | True False | Allow personal e-mail on device Do not allow personal e-mail on device | This setting specifies whether the mobile phone user can configure a personal e-mail account (either POP3 or IMAP4) on the mobile phone. |
| Allow desktop sync | Boolean | True | True False | Allow desktop synch Do not allow desktop synch | This setting specifies whether the mobile phone can synchronize with a computer through a cable, Bluetooth, or IrDA connection. |
| Allow HTML e-mail | Boolean | True | True False | Allow html format Convert to plain text | This setting specifies whether e-mail synchronized to the mobile phone can be in HTML format. If this setting is set to false, e-mail is converted to plain text. |
| Allow internet sharing | Boolean | True | True False | Allow Do not allow | This setting specifies whether the mobile phone can be used as a modem for a desktop or a portable computer. |
| Allow IRM over Exchange ActiveSync | Boolean | True | True False | Allow Do not allow | This setting specifies whether the mobile phone can read items sent using IRM. |

TABLE 1-continued

| Policy | Type | Default Value | Allowed Values | Actions | Description |
|---|---|---|---|---|---|
| AllowIrDA | Boolean | True | True False | Allow Do not allow | This setting specifies whether infrared connections are allowed to and from the mobile phone. |
| Allow Mobile OTA Update | Boolean | True | True False | Allow Do not allow | This setting specifies whether over the air software updates are allowed. |
| Allow non-provisionable devices | Boolean | True | True False | Allow Do not allow | This setting specifies whether older phones that may not support application of policy settings are allowed to connect to a specific server. |
| Allow simple password | Boolean | False | True False | Allow Do not allow | This setting enables or disables the ability to use a simple password such as 1234. The default value is true. |
| Allow POPIMAP Email | Boolean | True | True False | Allow Do not allow | This setting specifies whether the user can configure a POP3 or an IMAP4 e-mail account on the mobile phone. |
| Allow Remote Desktop | Boolean | True | True False | Allow Do not allow | This setting specifies whether the mobile phone can initiate a remote desktop connection. |
| Alphanumeric password used | Boolean | False | True False | Allow Do not allow | This setting uses that a password contains numeric and non-numeric characters. |
| Allow S/MIME encryption algorithm negotiation | Boolean | True | True False | Allow Do not allow | This setting specifies whether the messaging application on the mobile phone can negotiate the encryption algorithm if a recipient's certificate doesn't support the specified encryption algorithm. |
| Allow S/MIME software certificates | Boolean | True | True False | Allow Do not allow | This setting specifies whether S/MIME software certificates are allowed on the mobile phone. |
| Allow storage card | Boolean | True | True False | Allow Do not allow | This setting specifies whether the mobile phone can access information that's stored on a storage card. |
| Allow text messaging | Boolean | True | True False | Allow Do not allow | This setting specifies whether text messaging is allowed from the mobile phone. |
| Allow unsigned applications | Boolean | True | True False | Allow Do not allow | This setting specifies whether unsigned applications can be installed on the mobile phone. |
| Allow unsigned installation packages | Boolean | True | True False | Allow Do not allow | This setting specifies whether an unsigned installation package can be run on the mobile phone. |
| Allow Wi-Fi | Boolean | True | True False | Allow Do not allow | This setting specifies whether wireless Internet access is allowed on the mobile phone. |

TABLE 1-continued

| Policy | Type | Default Value | Allowed Values | Actions | Description |
|---|---|---|---|---|---|
| Approved application list | String | NULL | App Name App Id | Warning Delete | This setting stores a list of approved applications that can be run on the mobile phone. |
| Attachments enabled | Boolean | True | True False | Allow Do not allow | This setting enables attachments to be downloaded to the mobile phone. |
| Device encryption enabled | Boolean | False | True False | Enable Disable | This setting enables encryption on the mobile phone. |
| Maximum calendar age filter | Integer | 7 days | Integers | Set synchronization days to specified value | This setting specifies the maximum range of calendar days that can be synchronized to the mobile phone. The value is specified in days. |
| Password enabled | Boolean | True | True False | Enable Disable | This setting enables the mobile phone password. |
| Password expiration | String | Unlimited | Integer (days) "Unlimited" | Set password expiration days to specified value | This setting enables the administrator to configure a length of time after which a mobile phone password is changed. |
| Password history | Integer | 0 | Integer | Set password history to value | This setting specifies the number of past passwords that can be stored in a user's mailbox. A user can't reuse a stored password. |
| Policy refresh interval | String | Unlimited | Integer "Unlimited" | Set policy refresh interval to value | This setting defines how frequently the mobile phone updates the Exchange from the server. |
| Document browsing enabled | Boolean | True | True False | Enable Disable | This setting enables/disables document browsing on the mobile phone. |
| Maximum attachment size | String | Unlimited | Integer (kB) "Unlimited" | Set maximum attachment size to value | This setting specifies the maximum size of attachments that are automatically downloaded to the mobile phone. |
| Maximum failed password attempts | Integer | 4 attempts | Integer | Set max failed password attempts to value | This setting specifies how many times an incorrect password can be entered before the mobile phone performs a wipe of data. |
| Maximum inactivity time lock | Integer | 15 min | Integer | Set max inactivity time lock to value | This setting specifies the length of time that a mobile phone can go without user input before it locks. |
| Minimum password length | Integer | 4 characters | Integer | Set minimum password length as value | This setting specifies the minimum password length. |
| Maximum e-mail age filter | Integer | 3 days | Integer | Set maximum e-mail age filter as value | This setting specifies the maximum number of days' worth of e-mail items to synchronize to the mobile phone. The value is specified in days. |

TABLE 1-continued

| Policy | Type | Default Value | Allowed Values | Actions | Description |
| --- | --- | --- | --- | --- | --- |
| Maximum HTML e-mail body truncation size | Integer | 3 kB | Integer | Set maximum as value | This setting specifies the size beyond which HTML-formatted e-mail messages are truncated when they are synchronized to the mobile phone. The value can be specified in kilobytes (KB). |
| Minimum device password complex characters | Integer | 0 complex characters | Integer | Set minimum as value | This setting specifies the minimum number of complex characters used in a mobile phone password. A complex character is any character that is not a letter. |
| Maximum e-mail body truncation size | Integer | 3 kB | Integer | Set maximum as value | This setting specifies the size beyond which e-mail messages are truncated when they are synchronized to the mobile phone. The value can be specified in kilobytes (KB). |
| Use device encryption | Boolean | False | True False | Enable Disable | This setting specifies whether device encryption is used. |
| Use S/MIME messages | Boolean | False | True False | Use Do not use | This setting specifies whether S/MIME messages are encrypted. |
| Use manual synchronization while roaming | Boolean | False | True False | Use Do not use | This setting specifies whether the mobile phone synchronizes manually while roaming. Allowing automatic synchronization while roaming can be frequently lead to larger-than-expected data costs for the mobile phone plan. |
| Use storage card encryption | Boolean | False | True False | Use Do not use | This setting specifies whether the storage card is encrypted. |
| Unapproved InROM application list | String | Null | App Name App Id | Warning Delete | This setting specifies a list of applications that cannot be run in ROM. |
| Password recovery | Boolean | Disabled | Enabled Disabled | Allow password recovery Do not allow password recovery | When this setting is enabled, the mobile phone generates a recovery password that's sent to the server. If the user forgets their mobile phone password, the recovery password can be used to unlock the mobile phone and enable the user to define a new mobile phone password. |
| Mobile OTA update mode | Enumeration | | | Set update mode as value | This parameter is available for multitenant deployments. The MobileOTA UpdateMode parameter specifies the Mobile OTA Update mode. |

TABLE 1-continued

| Policy | Type | Default Value | Allowed Values | Actions | Description |
|---|---|---|---|---|---|
| Use encryption S/MIME algorithm | Boolean | False | True False | Use encryption algorithm Do not use encryption algorithm | This setting specifies what used algorithm is used when encrypting a message. |
| Use signed S/MIME algorithm | Boolean | False | True False | Use signed algorithm Do not use signed algorithm | This parameter specifies what algorithm is used when signing a message. |
| Use signed S/MIME messages | Boolean | False | True False | Use signed messages Do not use signed messages | This setting specifies whether the mobile phone send signed S/MIME messages. |
| UNC file access | Boolean | Enabled | Enabled Disabled | Allow file access Do not allow file access | |
| WSS file access | Boolean | Enabled | Enabled Disabled | Allow file access Do not allow file access | |
| Device/Device Health Policies | | | | | |
| iOS version check | String | Allow | String | Allow Warn Block container launch | Take action if iOS version is less than specified value. |
| Android version check | String | Allow | String | Allow Warn Block container launch | Take action if Android version is less than specified value. |
| Virus/Infected device | Boolean | False | True False | Block container launch Allow container launch | Block container launch and/or container application launch if virus found or device otherwise deemed infected. |
| Rooted/Compromised device | Boolean | False | True False | Block container launch Allow container launch | Block container launch and/or container application launch if device is rooted or otherwise found compromised. |
| Container/ Application Policy Precedence | | | | | In cases where a policy is defined both at the container level and at the application level, tenant admins have the option at the application level to explicitly accept the container policy or override the container policy and select a different policy option. |
| Application authentication | Boolean | False | True False | Use app authentication Do not use app authentication | If set to true for application, use authentication (using corporate credentials or security system credentials) prior to application launch. |
| Key chain | Boolean | True | True False | Allow keychain to cache credentials Do not allow keychain to cache credentials | If set to false for application, do not allow device or security software key chain to cache credentials. |

TABLE 1-continued

| Policy | Type | Default Value | Allowed Values | Actions | Description |
|---|---|---|---|---|---|
| Application shortcut | Boolean | True | True False | Allow creation of shortcut Do not allow creation of shortcut | If set to false for application, do not allow creation of application shortcut to personal home screen. |
| Application Cut-or-Copy | Enum | Business Apps | Disable, Business Apps, All Apps | Controls cut and copy commands | Describes what cut-and-copy is allowed. The clipboard from secured applications can be encrypted by default. |
| Application Paste | Enum | Business App | Disable, Business Apps, All Apps | Controls paste command | Describes where the clipboard can be pasted. |
| Application black list | String | NULL | App Name App Id | Warning Force delete | This setting stores a list of unapproved applications that, if detected on the device (either personal space and/or within the container), can prompt a warning on the edge device or will not allow access to the container until the application is deleted. |
| Application location-based access | Boolean | True | True False | Allow access/launch at location Disallow access/launch at location | At runtime, the security software can automatically evaluate application location access conditional logic to allow/disallow access/launching of applications. |
| Container location-based access | Boolean | True | True False | Allow container access/launch at location Disallow container access/launch at location | At runtime, the security software can automatically evaluate the device location and conditional logic to allow/disallow access/launching of the container. See above. The following example is provided to demonstrate trusted/untrusted policy set conditional logic: "Launching the CFO App is allowed if the device launching the container is in corporate network in New York City. In other cases, I want the CFO App to be disallowed" |
| Container authentication | Enumeration | 8 hr | Value (hr) Never Always | Force encryption after Value (hr) Never use container auth Always use container auth | This setting specifies when container authentication occurs after a first container login (first login is defined as any login that occurs either upon first use; container installation; mobile device power-on). If a value is set, then a login occurs after value hours. |

TABLE 1-continued

| Policy | Type | Default Value | Allowed Values | Actions | Description |
|---|---|---|---|---|---|
| Container encryption | Boolean | True | True False | Enable encryption Disable encryption | This setting specifies whether content within the container is encrypted. |
| Application encryption | Boolean | True | True False | Enable encryption Disable encryption | This setting specifies whether data for the application in question is encrypted. |
| Application authentication | Boolean | False | True False | Enable Disable | This setting specifies whether an application uses a user to enter authentication credentials upon each launch. Default app authentication will prompt user for pin. If stronger auth used, strong auth flag can be set --> this will then prompt user to enter full corporate credentials. |
| Container VPN used | Boolean | False | True False | Enable Disable | This setting specifies if a VPN connection is used prior to launching the container. |
| Application VPN used | Boolean | False | True False | Enable Disable | This setting specifies if a VPN connection is used prior to launching the application in question. |
| Automatic VPN connection | Boolean | False | True False | Enable Disable | This setting specifies that at launch of the container and/or launch of a container application, VPN connection would be automatically established. |
| Container offline access allowed | Boolean | True | True False | Allowed Disallowed | This setting specifies if the container can be launched when the edge device is offline. |
| Application offline access allowed | Boolean | True | True False | Allowed Disallowed | This setting specifies if the application in question can be launched when the edge device is offline. |
| Container file/doc sharing | Boolean | True | True False | Allowed Disallowed | This setting specifies if applications within the container are allowed to share files/docs with other container apps. |
| Application file/doc sharing | Boolean | True | True False | Allowed Disallowed | This setting specifies if the specific application in question within the container is allowed to share files/docs with other container apps. |
| Application/ URL launching | Boolean | True | True False | Allowed Disallowed | This setting specifies if an application can launch another application internal to the container (launching container apps from the personal container can be prohibited) or an external URL. |
| Automatic virus scan -- container | Boolean | True | True False | Enable Disable | This setting specifies that prior to the launch of the |

TABLE 1-continued

| Policy | Type | Default Value | Allowed Values | Actions | Description |
|---|---|---|---|---|---|
| | | | | | container or container application, the launching device executes and passes a virus scan. If the virus scan fails, then the container and/or container application can be prevented from launching. |
| Automatic virus scan -- container app | Boolean | False | True False | Enable Disable | This setting specifies that prior to the launch of a container application, the launching device executes and passes a virus scan. If the virus scan fails, then the container application is prevented from launching. |

In some embodiments, evaluation of policy criteria can be triggered by specific events such as, for example, change in network or geolocation, download or attempted download of an application, or other specified edge-user initiated or edge device initiated action. The evaluation of policy can also be triggered by expiration of tenant specified time period (e.g., policy expiration token), polling event with polling interval set by tenant and/or administrator, or remotely on-demand by tenant and/or administrator.

In some embodiments, application location-based access rules can be determined based on location variables and criteria (e.g., geographical or physical location of a device at time of evaluation to the granularity of city). Administrators may specify city, state and/or country. The security software and/or security system can implement logic to identify a device location and determine if geolocation criteria is satisfied. Geolocation values can be pre-seeded by an operator of the security system and be available for selection.

In some embodiments, a network can be the network connectivity protocol that a device is invoking at time of policy condition evaluation. Network can be specified or identified as and network values pre-seeded by the operator of the system and available for selection (e.g., 3G/4G, SSID, etc.). Other commonly used network protocols and protocol identifiers such as, for example, Internet Protocol (IP) or IP ranges can also be used.

In some embodiments, application location can be evaluated based on conditional logic. Various logical operators (e.g., ==, !=, >, <, >=, <=, AND, OR, &&, ||) and wildcards can be used by tenant administrators to evaluate policy set criteria.

In some embodiments, in addition to creating a secure environment on mobile devices including securing applications and documents on the device, mobile devices can be secured in another approach (i.e., document-access approach) by bringing documents and data (e.g., corporate documents and data) into the secure context of the device and the individual application. In such an approach, the need to first install corporate-data-specific access application can be avoided. Moreover, using that access application to download the file, transferring the file from the access application into another application, and finally transferring the file back into the access application can also be avoided. Further, once the document-access approach is adopted, additional functionality such as, for example, task managers, can be added.

The document-access approach can be considered as a type of "follow me data" or secure workflow. With such an approach, for example, data from a desktop device stored securely within the corporate environment (e.g., using a product from AppSense Limited such as DataNow) can be accessed directly from the secure applications on the mobile device. The document-access approach can modify applications to recognize an additional gesture, and to present a new overlay over the wrapped applications when the gesture is recognized. Thus, new intercepts can be added above the libc-level in an OS specific fashion. For example, for iOS methods in UIView class (e.g., addSubview:, etc), an application to initiate gesture recognition via UITapGestureRecognizer class can be modified to recognize the new gesture. The modification can be universal (e.g., all wrapped applications make use of triple-tap) or specific to an application (e.g. a first application makes use of triple-tap, a second application makes use of swipe-up from the bottom, a third application makes use of another gesture or mechanism). Potential gestures that can be recognized can include, for example, swipe from a side (e.g., bottom, top, left, right), rotate gesture, a panning gesture (swiping with multiple fingers), and/or the like. The document-access approach is further discussed in detail with respect to FIGS. 7-11.

Figure 9:
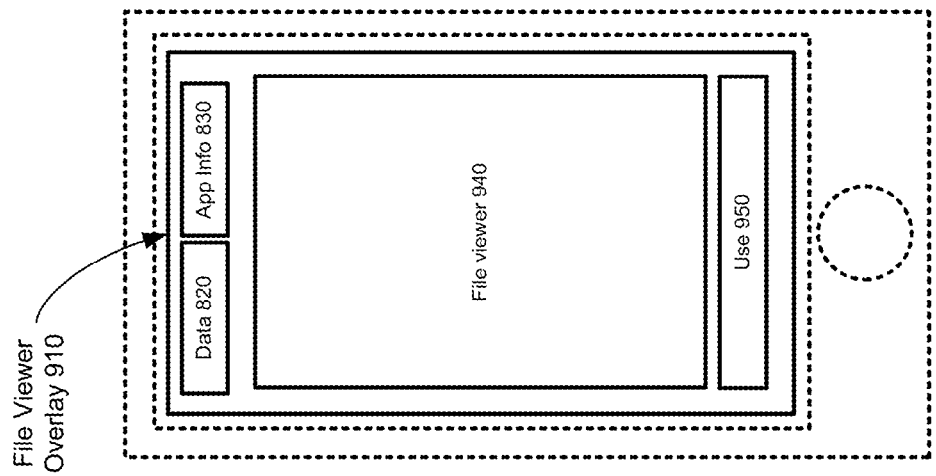
FIGS. 7-10 are illustrations of sample user interfaces, according to various embodiments.
Figure 8:
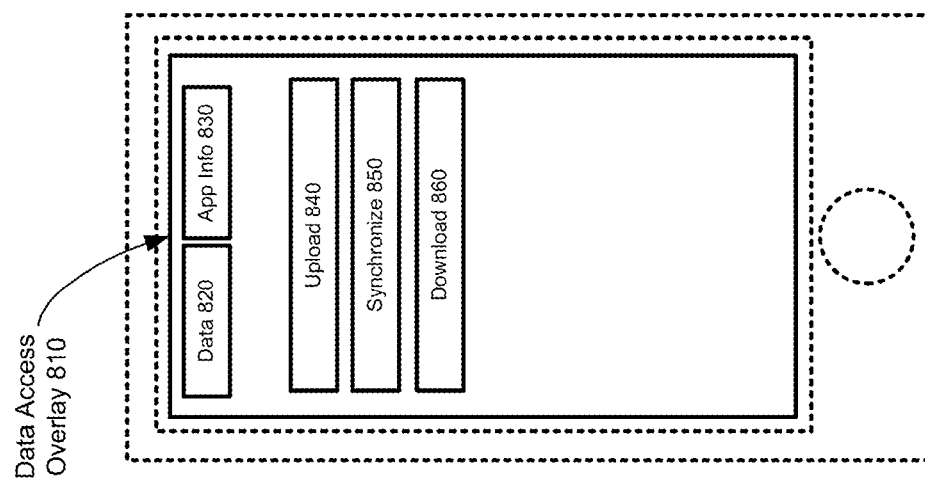
Figure 7:
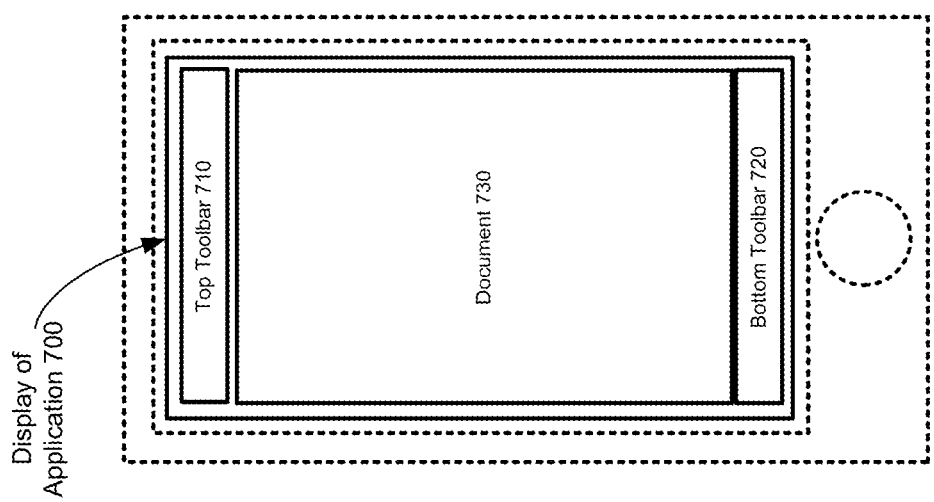
Figure 10:
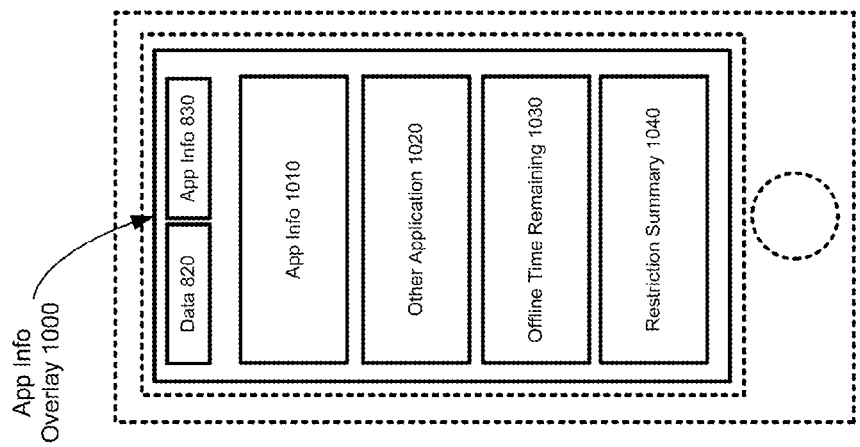

FIGS. 7-10 are illustrations of sample user interfaces, according to various embodiments. The same conventions as in the earlier user interface drawings (i.e., FIGS. 4-5) are used in FIGS. 7-10, where dotted lines represent a prototypical mobile device. In FIG. 7, a user interface for a wrapped application (e.g., display of application 700) is shown. This particular application 700 supports documents. As shown in FIG. 7, document 730 is dominating the visible area and several toolbars including top toolbar 710 and bottom toolbar 720 are also displayed. From the application developer's perspective, the underlying application is unaware of the corporate data repository and no code or support has been added. However, as discussed above, the application 700 can be wrapped to recognize a new gesture such as, for example, triple-tap for iOS. Upon receiving the new gesture, the code added by the wrapper can interject new user interface elements that, for example, deactivate and/or obscure the underlying application. Thus, control of the application is within the additional code added by the intercepts that is displaying the overlays. Three overlay views are shown in FIGS. 8-10, each of which shows a different aspect of functionality that can be provided.

FIG. 8 illustrates a document management interface, according to an embodiment. At the top in FIG. 8, a tabbed UI allows switching between data management (i.e., icon or selector for data 820) and application information (i.e., icon or selector for app info 830). FIGS. 8-9 illustrate sample user interfaces for the data management tab, and FIG. 10 illustrates a sample user interface for the application information tab. In FIG. 8, a mostly manual-style approach for data access is shown with the ability to (1) upload data/files currently in the application into the corporate data repository (i.e., icon or selector for upload 840); (2) download data/files from the corporate data repository into the application (i.e., icon or selector for download 860); and (3) synchronize the local and cloud copies (i.e., icon or selector for synchronize 850).

In some embodiments, synchronization can be performed automatically by, for example, making use of information regarding when an application moves to the foreground/background, when an application is idle, launched, and/or terminated. In some embodiments, for example, changes can be synchronized periodically (e.g., every N minutes or seconds) if the application is idle. In other embodiments, synchronization can be performed (e.g., data being synchronized to the corporate repository) in response to sync calls (as opposed to writes), which can be treated as an indication that a file has reached a meaningful checkpoint state. In still other embodiments, synchronization can be performed in response to, for example, a "Save" workflow of the application. In such embodiments, implementation of the synchronization mechanism can include per-application customization of the wrapper.

FIG. 9 illustrates a file viewer (file viewer 940) according to an embodiment. The file viewer can display a suitable visual representation of file/data either hierarchically or otherwise. In some embodiments, multiple items can be selected simultaneously. When the user has identified the files/data of interest, the user can trigger use of them (e.g., icon or selector for use 950). In other embodiments, only a single item can be selected at any given time. The button of use 950 can trigger a download and suitable opening of the item(s) in the application. In some embodiments, after the user dismisses the overlay (e.g., using a done icon or selector (not shown in FIG. 9), using a gesture such as triple tap, etc.), the appropriate files/data can be available in the application's context. In such embodiments, the user can then select the document open command within the application.

FIG. 10 illustrates an application information tap (e.g., by clicking icon or selector for app info 830), according to an embodiment. Such an application information tap can be used to provide context about the secure environment. As shown in FIG. 10, exemplary information provided in this view can include, for example, application info 1010 (e.g., overlaid application name, current version, latest version available), other application 1020 information (e.g., number of new applications available in the corporate environment, number of updates available), offline time remaining 1030 (e.g. how many days/hours/minutes can the secure environment be used while staying offline), a restriction summary 1040 (e.g., summarize key restrictions on the application such as no copy/paste, no printing, etc.), etc. Additionally, other items that can be provided in the overlay (not shown in FIG. 10) can include, for example, a secure task manager, lists of recent files, user changeable settings (e.g., per application PINS, reset master PIN, MAM (mobile application management) layer settings, etc.), and/or the like. Those additional items can also be displayed for, for example, troubleshooting/help desk purposes, help desk contact/ticket submission request flow, and/or the like.

Figure 11:
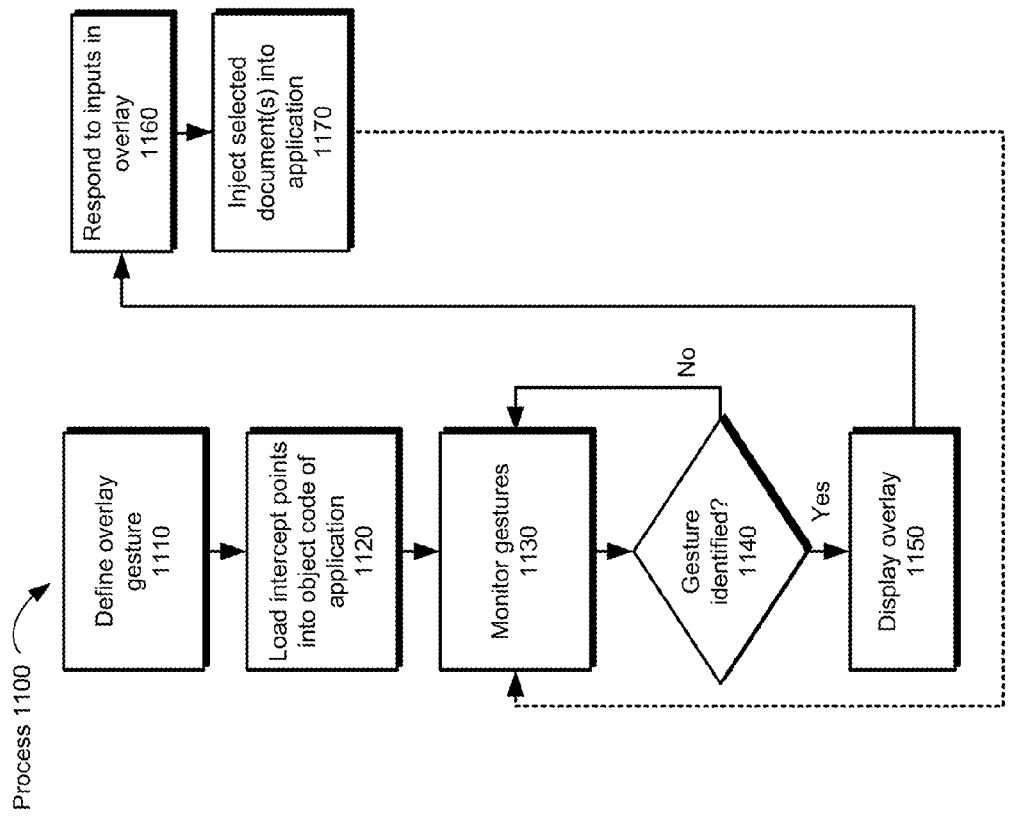
FIG. 11 is a flowchart of a process for providing mobile application security, according to an embodiment.

FIG. 11 is a flowchart of a process 1100 for providing mobile application security, according to an embodiment. As shown in FIG. 11, the process 1100 starts with defining the overlay gesture at 1110. The gesture can be OS- and/or application-specific. For example, the default gesture for iOS can be a triple-tap, but the gesture for a specific application can be a swipe-up from the bottom of the screen. Similarly, on Android the default gesture can be a swipe.

At 1120, the intercept points are loaded into the object code of the application. This step could occur in conjunction with step 620 of the process 600 (shown and described with respect to FIG. 6). In some embodiments, the process 1100 and the process 600 can be performed concurrently on a single application.

At 1130, the additional code loaded by the intercepts monitors gestures. At 1140, it is determined whether the gesture is identified. If the gesture is identified at 1140, then the process proceeds to 1150, otherwise the process proceeds to 1130 to repeat monitoring gesturers.

At 1150, the overlay is displayed. As discussed above, the overlay can disable and/or obscure the underlying application's user interface. In the embodiment associated with the process 1100, the overlay UI and associated code are executing in the context of the application itself, which is arising from the intercepts added at 1120.

At 1160, the UI of the overlay is handled. In the process 1100, the loading of a document is the focus. Thus, for example, if the user selects the data tab (e.g., by selecting the icon or selector for data 820 in FIG. 8), selects download (e.g., by selecting the icon or selector for download 860 in FIG. 8), then selects a file (e.g., in the file viewer 940 in FIG. 9), and finally selects to use the file (e.g., by selecting the icon or selector for use 950 in FIG. 9), the selected document can be injected into the application, at 1170. In some embodiments, the data is downloaded from the corporate data repository. In some cases, some or all of the data may already be local to the device due to caching or other mechanisms not directly discussed herein.

In the example of a document file to be opened, selecting the icon or selector for use 950 can trigger the download from, for example, a corporate cloud storage environment (e.g., DataNow environment). As part of the download, appropriate corporate security policies for access can be enforced. Furthermore, once the document is on the mobile device, the document can be locally encrypted as discussed above regarding data protection. Additionally, the data in the remote storage environment can be encrypted. In some embodiments, different encryption systems and/or keys can be used in the cloud and/or the device. For example, the same encryption system (e.g. AES (advanced encryption standard)) with different keys can be used on the cloud and the device, respectively.

At 1170, the encrypted data (e.g., a document file) is injected into the application. This can be implemented by, for example, storing the (encrypted) document file in the OS-appropriate place for the application. For example, documents on iOS can be stored within the application's folders. In some embodiments, the process 1100 does not bring the user back to a user interface with selected document loaded (e.g., as the display of application 700 in FIG. 7). Accordingly, one or more of the following approaches can be used at 1170 (removal of the overlay display is assumed):

Generate a launch message from within the overlay running on the application to the application with the identifier of the new data;

Application-specific wrapper code to trigger open events within the application;

Work with developers to support a customized SDK (e.g. an AppSense or Datallow SDK) that allows the overlay to signal information to the application and/or the application to trigger requests for data without the need for a gesture.

In some embodiments, other suitable approaches not described herein can also be used to make use of intercepting built-in cloud data APIs for purposes of data access.

Additionally, as shown by the dotted line from 1170 to 1130, gesture detection can begin again after the overlay is removed. In some embodiments, although not shown in FIG. 11, the process can resume at 1120 instead of 1130 in the case where the application is re-launched. Accordingly, while the discussion herein is focused on data access, the application information access (e.g., shown and described with respect to FIG. 10) and the approach of adding a gesture plus an overlay to a running application remain independently important. For example, the gesture can provide access to a customized task manager for the secure environment. In such a case, the gesture and approach of FIG. 11 (except step 1170) can be used even if a cloud-based intercept approach is used for data access. Embodiments providing a secure task manager allow selection and activation of other, typically running, applications on the mobile device that are within a given security context. By security context here we refer to other applications that are in the same container (e.g., if there is a general container and a secured container on a given device, then only the applications in the secured container would be in the same context). However, in other embodiments, the security context can be more finer grained (e.g., other applications with more specifically matching permissions). For example, in a high-sensitivity corporate data application, switching can be used to access other applications with the same sensitivity level but not applications with a different sensitivity level.

Embodiments described herein include methods for accessing data within an application on a mobile device from a data source. The object code of the application by an author different from an operator of the data source can be obtained for modification and dynamically loading at least one intercept point into the object code to detect a predetermined input gesture. Responsive to an input gesture received within the context of the application and matching the predetermined input gesture, (1) a user interface within the context of the application can be overlaid, where the user interface permits selection of data items from the data source; (2) a selected data item can be determined from a selection signal received at the mobile device; (3) the selected data item can be loaded into the context of the application on the mobile device; and (4) the user interface overlay can be removed.

In some embodiments, a built-in OS level cloud data system can be selectively modified to proxy access to the secure data store. Using iOS as an example, calls by wrapped applications that support iCloud can be wrapped in such a way that instead of iCloud data, data from the secure environment is shown. This approach does not require a gesture, but requires selective modification of applications to modify the behavior of iCloud API calls to make use of the corporate data store.

In some embodiments, an application can be "water marked" and a more permanently present indicator (though generally more transparent compared to other UI elements) can be added indicating the wrapped status of the application. This water mark can also accept inputs that can trigger access to data of the types described above in connection with FIGS. 7-11.

In some embodiments, the approach provided can be used in exam/test taking contexts. In such embodiments, a secure test taking container can be installed on a baseline device with a policy restricting network usage outside the container. This can facilitate secure use of the test taking application without access to the internet from the general browser.

In some embodiments, additional application and data policies can be implemented that provide finer grained control over applications.

In some embodiments, a SDK and/or library can be provided for application developers to enable hooks for custom policies in applications that embodiments of the system can enforce. For example, if an email application wants to declare custom policy hooks for forwarding messages with attachments as opposed to replying to emails, the application can insert a call to the SDK in conjunction with the forward command and then the provider's policy, when set, can be triggered.

In some embodiments, the security system 120 can provide alternative billing/licensing/pricing models for applications that are distributed to managed devices. For example, instead of paying a one-time fee for an application installation, the system can enable a company to pay the application developer based on overall usage levels.

In some embodiments, the system can provide a mechanism for distributing secure containers to consumers from businesses for carrying out tasks. This can provide protected access to sensitive financial and/or medical records in a manner that protects the information from device and malicious applications. For example, a bank can distribute a container with a single application (that looks like a native application) but which implements the policy and security mechanisms described herein. This application can then maintain its data separate from other applications and can be protected as described herein.

In some embodiments, the system can provide over-the-air, one-click provisioning for mobile users. This can include installing both a vendor-provided security profile, (e.g., Mobile Device Management for iOS) and application level policies.

In some embodiments, user provisioning can include pre-configuring applications and devices. For example, application and device configuration profiles, or bundles, can be defined and then pushed to users' devices to automatically configure device settings (e.g., applications, WiFi, Virtual Private Network (VPN), email configuration, etc.).

In some embodiments, web-based, remote tenant provisioning can be provided to self-provision tenants and associated policies and application catalog(s).

Some embodiments can include a multi-sourced application catalog with applications from multiple parties and aggregation of those applications into a single catalog. The individual tenants can subscribe and inherit individual applications and/or full categories of applications from the master catalog, optionally with associated policies.

Some embodiments can provide in-memory data controls and protection including one or more of wipe or delete data on freeing data operation, wipe or delete data on application backgrounding, wipe or delete data on application closing, and/or wipe or delete data on application inactivity timeout interval.

In some embodiments, the security system 120 can provide protection for data at rest, for data in memory and/or for data in motion. For example, the provided protection can include encryption of one or more of data at rest with unique per-application keys. The protection of data in memory can be provided by minimizing window of attack by limiting the life time of the data in memory (e.g., based on policy). In such embodiments, data in motion can be protected by using application VPN.

Some embodiments support viewing and editing data in remote locations (e.g., network folders). Such embodiments can allow a mobile user to securely access files from a remote server/cloud and perform one or more of pulling the file(s) over the air to the device, providing the file(s) to an application for viewing and/or editing, and/or enabling updated and/or modified versions of the file(s) to be sent to the server/cloud. In such embodiments, each application can have its own sandboxed copy.

Some embodiments provide application VPNs and per-application VPNs. Some embodiments provide application and data analytics and event logs (e.g., detailed application, device and data analytics).

It is intended that the methods and apparatus described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and other object-oriented, procedural, or other programming language and development tools. Examples of computer code include, but are not limited to, micro-code or micro-instructions, machine instructions, such as, for example, produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as, for example, space or a cable). The media and computer code (also can be referred to as code) can be those designed and constructed for the specific purpose or purposes. Examples of non-transitory computer-readable media include, but are not limited to, magnetic storage media such as, for example, hard disks, floppy disks, and magnetic tape; optical storage media such as, for example, Compact Disc/Digital Video Discs (CD/DVDs), Compact Disc-Read Only Memories (CD-ROMs), and holographic devices; magneto-optical storage media such as, for example, optical disks; carrier wave signal processing modules; and hardware devices that are specially configured to store and execute program code, such as, for example, Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps can be modified. Additionally, certain steps can be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A method, comprising:
obtaining an object code of an application executed on a mobile device, the application created by an author different from an operator of a data source;
loading dynamically at least one intercept point into the object code of the application, the at least one intercept point to detect a predetermined input gesture;
responsive to an input gesture received at the mobile device, the input gesture received within a context of the application and the input gesture matching the predetermined input gesture,
overlaying a user interface within the context of the application, the user interface permitting selection of data items from the data source;
determining from a selection signal received at the mobile device, a selected data item;
responsive to the determining, loading the selected data item into the context of the application; and
removing the user interface overlay.

2. The method of claim 1, wherein the loading the selected data item includes retrieving the selected data item from a remote computer over a network.

3. The method of claim 1, wherein the loading the selected data item includes retrieving the selected data item from a remote computer over a network, the method further comprising:
decrypting the selected data item from a first encrypted format using a first key; and
encrypting the selected data item with a second encrypted format using a second key.

4. The method of claim 1, wherein the loading the selected data item includes retrieving the selected data item from a remote computer over a network, the method further comprising:
decrypting the selected data item from a first encrypted format using a first key and encrypting the selected data item with a second encrypted format using a second key, the first encrypted format being the same as the second encrypted format, the first key being different from the second key.

5. The method of claim 1, wherein the predetermined input gesture is one of triple tap, swipe from sides or bottom, rotate, or panning.

6. The method of claim 1, wherein the user interface provides information about a secure context enforced on the application.

7. A method, comprising:
obtaining a modified object code of an application executed on a mobile device, the modified object code being defined from an unmodified object code of the application, the unmodified object code being provided by a first party, the modification including:
removal of a digital signature on the unmodified object code of the application;
installing at least one intercept point into the unmodified object code of the application; and signing the application with a digital signature of a second party to define the modified object code, the second party being different from the first party;
executing the modified object code of the application on the mobile device;
responsive to an input gesture received at the mobile device, the input gesture received within a context of the application and the input gesture matching a predetermined gesture,
    overlaying a user interface within the context of the application on the mobile device, the user interface permitting selection of data items from a data source;
    determining from a selection signal received at the mobile device, a selected data item;
    responsive to the determining, loading the selected data item into the context of the application; and
    removing the user interface overlay.

8. The method of claim 7, wherein the loading the selected data item includes retrieving the selected data item from a remote computer over a network.

9. The method of claim 7, wherein the loading the selected data item includes retrieving the selected data item from a remote computer over a network, the method further comprising:
    decrypting the selected data item from a first encrypted format using a first key; and
    encrypting the selected data item with a second encrypted format using a second key.

10. The method of claim 9, wherein the loading the selected data item includes retrieving the selected data item from a remote computer over a network, the method further comprising:
    decrypting the selected data item from a first encrypted format using a first key and encrypting the selected data item with a second encrypted format using a second key, the first encrypted format being the same as the second encrypted format, the first key being different from the second key.

11. The method of claim 7, wherein the predetermined gesture is one of triple tap, swipe from sides or bottom, rotate, or panning.

12. The method of claim 7, wherein the user interface provides information about a secure context enforced on the application.

13. A method comprising:
obtaining an object code of an application executed on a mobile device, the application created by an author different from an operator of a data source;
loading dynamically at least one intercept point into the object code of the application, the at least one intercept point to detect a predetermined input gesture;
responsive to an input gesture received at the mobile device, the input gesture received within a context of the application and the input gesture matching the predetermined input gesture,
    overlaying a user interface within the context of the application, the user interface providing a secure task manager allowing selection and activation of a group of applications executed on the mobile device which are within a given security context;
    determining from a selection signal received at the mobile device, a selected application from the group of applications;
    responsive to the determining, activating the selected application on the mobile device; and
    removing the user interface overlay.

14. A system comprising:
a storage;
a network interface, and
a computer system, the computer system communicatively coupled with the network interface and the storage, the computer system including a controller configured to:
receive an object code of an application executed on a mobile device, the application created by an author different from an operator of a data source;
dynamically load at least one intercept point into the object code of the application, the at least one intercept point to detect a predetermined input gesture;
responsive to an input gesture received at the mobile device, the input gesture received within a context of the application and the input gesture matching the predetermined input gesture,
    overlay a user interface within the context of the application, the user interface permitting selection of data items from the data source;
    determine from a selection signal received at the mobile device, a selected data item;
    responsive to the determining, load the selected data item into the context of the application; and
    remove the user interface overlay.

15. The system of claim 14, wherein the controller is configured to retrieve the selected data item from a remote computer over a network.

16. The system of claim 14, wherein:
the controller is configured to retrieve the selected data item from a remote computer over a network, the controller configured to, after retrieving the selected data item, decrypt the selected data item from a first encrypted format using a first key and encrypt the selected data item with a second encrypted format using a second key.

17. The system of claim 14, wherein:
the controller is configured to retrieve the selected data item from a remote computer over a network, the controller configured to, after retrieving the selected data item, decrypt the selected data item from a first encrypted format using a first key and encrypt the selected data item with a second encrypted format using a second key, the first encrypted format being the same as the second encrypted format, the first key being different from the second key.

18. The system of claim 14, wherein the predetermined input gesture is one of triple tap, swipe from sides or bottom, rotate, or panning.

19. The system of claim 14, wherein the user interface provides information about a secure context enforced on the application.

* * * * *